(12) United States Patent
Takatori et al.

(10) Patent No.: US 7,830,881 B2
(45) Date of Patent: Nov. 9, 2010

(54) CONTENT RECEIVER AND CONTENT TRANSMITTER

(75) Inventors: Masahiro Takatori, Toyonaka (JP); Shoichi Goto, Ibaraki (JP)

(73) Assignee: Panasonic Corporation, Osaka (JP)

( * ) Notice: Subject to any disclaimer, the term of this patent is extended or adjusted under 35 U.S.C. 154(b) by 1667 days.

(21) Appl. No.: 10/515,528

(22) PCT Filed: Jul. 16, 2003

(86) PCT No.: PCT/JP03/09043
§ 371 (c)(1),
(2), (4) Date: Nov. 23, 2004

(87) PCT Pub. No.: WO2004/008760
PCT Pub. Date: Jan. 22, 2004

(65) Prior Publication Data
US 2005/0237434 A1    Oct. 27, 2005

(30) Foreign Application Priority Data
Jul. 16, 2002    (JP) ............................. 2002-206780

(51) Int. Cl.
*H04L 12/28* (2006.01)
(52) U.S. Cl. ..................................... 370/392; 370/428
(58) Field of Classification Search ......... 370/486–487, 370/535, 392, 412, 428, 537, 468, 477
See application file for complete search history.

(56) References Cited

U.S. PATENT DOCUMENTS

| | | | | |
|---|---|---|---|---|
| 4,385,395 A * | 5/1983 | Tanaka et al. | ................ | 375/359 |
| 5,920,572 A * | 7/1999 | Washington et al. | ........ | 370/535 |
| 6,526,107 B1 * | 2/2003 | Katoh et al. | ................. | 375/368 |
| 6,587,985 B1 * | 7/2003 | Fukushima et al. | ......... | 714/748 |
| 7,023,924 B1 * | 4/2006 | Keller et al. | ........... | 375/240.26 |
| 7,058,081 B2 | 6/2006 | Yoshida et al. | | |
| 7,349,386 B1 * | 3/2008 | Gou | ........................... | 370/356 |
| 2001/0013123 A1 * | 8/2001 | Freeman et al. | ............... | 725/34 |

(Continued)

FOREIGN PATENT DOCUMENTS

EP    1182812 A2 *    2/2002

(Continued)

OTHER PUBLICATIONS

International Search Report for PCT/JP03/09043, dated Aug. 26, 2003.

*Primary Examiner*—Brian D Nguyen
*Assistant Examiner*—Roberta A Shand
(74) *Attorney, Agent, or Firm*—RatnerPrestia

(57) ABSTRACT

A transmitting party adds reproduction time information to each transport packet to form an extended transport packet, encapsulates the extended transport packet, adds capsule counter information, and transmits the capsule. A receiving party has a storage means, and transmits a re-send request including the capsule count information to the transmitting party when a packet loss occurs. At the receiving party, the re-sent data received overwrites data in its original storage region. At reproduction, the receiving party decodes the data after compensating for jitter referring to reproduction time information. Accordingly, a packet loss or jitter is compensated for at both transmitting and receiving parties in a communications network such as the Internet so as to prevent the occurrence of a decoding error at the receiving party.

38 Claims, 16 Drawing Sheets

U.S. PATENT DOCUMENTS

| | | | |
|---|---|---|---|
| 2002/0172281 A1* | 11/2002 | Mantchala et al. | 375/240.12 |
| 2003/0223466 A1* | 12/2003 | Noronha et al. | 370/537 |
| 2005/0060759 A1 | 3/2005 | Rowe et al. | 725/143 |
| 2006/0262813 A1* | 11/2006 | Dygert | 370/477 |

FOREIGN PATENT DOCUMENTS

| | | |
|---|---|---|
| JP | 7-212245 A | 8/1995 |
| JP | 10-313350 A | 11/1998 |
| JP | 11-88856 A | 3/1999 |
| JP | 2000-307637 A | 11/2000 |
| JP | 2001-16267 A | 1/2001 |
| JP | 2001-320413 A | 11/2001 |
| JP | 2002-51321 A | 2/2002 |
| JP | 2002-141917 | 5/2002 |
| JP | 2002-141917 A | 5/2002 |
| KR | 1020020032730 | 5/2002 |
| WO | WO 2004/008760 | 1/2004 |

* cited by examiner

US 7,830,881 B2

CONTENT RECEIVER AND CONTENT TRANSMITTER

THIS APPLICATION IS A U.S. NATIONAL PHASE APPLICATION OF PCT INTERNATIONAL APPLICATION PCT/JP2003/009043.

TECHNICAL FIELD

The present invention relates to digital television broadcast receivers, personal computers, mobile phones, personal digital assistants, and mobile phone adapters.

BACKGROUND ART

In recent years, transmitters and receivers that have functions including streaming for transmitting and receiving images, sound, and content through communications networks are becoming popular on the market.

A conventional content transmitter is described next. FIG. 7 shows a structure of the conventional content transmitter. FIG. 10 shows a transition of a packet structure in conventional content transmitters and content receivers. FIG. 11 shows the conventional packet structure.

Video encoder 51 in FIG. 7 encodes video signals using a predetermined compression format, and outputs encoded signals to the next step. FIG. 7 shows the case of using the MPEG2 format. The output from video encoder 51 is composed of the MPEG2 transport stream packet (MPEG2-TSP).

System clock generator 54 generates a 27-MHz clock signal. Video encoder 51 uses this 27-MHz clock as a system clock for encoding video signals.

Audio encoder 52 encodes audio signals using the same compression format as video encoder 51, and outputs MPEG2-TSP signals to the next step. Data encoder 53 encodes data broadcasting and EPG data using the same compression format as video encoder 51, and outputs MPEG2-TSP signals to the next step.

Stream multiplexer 55 multiplexes the above three types of MPEG2-TSP signals on a time base. Stream multiplexer 55 also generates a PCR signal that reproduces the system clock on the receiving side by periodically using the count of the system clock at a cycle of about 50 ms. This stream multiplexer 55 further multiplexes the above multiplexed signals after encoding PCR signals to MPEG2-TSP, and outputs an MPEG2 transport stream (MPEG2-TS) signals to the next step (this output signal is S11 in FIG. 10).

FIG. 10 shows a transition of packet multiplexing on the time base. In FIG. 10, the abscissa is time. Any stationary delay in each processing is ignored, and thus are not indicated in FIG. 10. VIDEO1, VIDEO2, VIDEO3, AUDIO1, AUDIO2, and DATA1 in S11 are packets multiplexed by stream multiplexer 55. Moreover, VIDEO1, VIDEO2, and VIDEO3 in S11 are video-encoded MPEG2-TSPs. AUDIO1 and AUDIO2 in S11 are audio-encoded MPEG2-TSPs. DATA1 in S11 is data-encoded MPEG2-TSP. The PCR signal is a known fact in the MPEG2 system, and thus its description is omitted here.

Scrambler 56 encrypts MPEG2-TS using a predetermined encryption method, and outputs an encrypted signal. An example of the MULTI2 method is shown in the description.

RTP packetizer 58 encapsulates one or more individual MPEG2-TSPs. RTP packetizer 58 has a counter which counts the bus clock reproduced based on reference time information provided to transmitter receiver 61 from a communications network. Transmitter receiver 61 is described later. RTP packetizer 58 then adds a header containing a time stamp which is the count and information for identifying that encapsulated information is MPEG2-TSP to the output signal. This output signal is S12 in FIG. 10. RTP of S12 is the header. The time stamp is used for correcting jitter using the bus clock when a packet arrives at the receiving side.

UDP/IP packetizer 59 stores each RTP packet in an IP datagram for transmitting each RTP packet over the IP communications network. UDP-IP packetizer 59 then adds an IP packet header to each of the stored RTP packets, and outputs them as IP packets. This output signal is S13 in FIG. 10. The IP of S13 is a header such as the IP header in the communications protocol. The IP packet header is a known fact in Internet protocol, and thus its description is omitted here.

Ethernet packetizer 60 stores the IP packet in the Ethernet data region, adds an Ethernet packet header and checksum, and then outputs it as the Ethernet packet. The Ethernet packet header and checksum are known facts in Internet protocol, and thus their description is omitted here.

Transmitter receiver 61 transmits the Ethernet packet to the Internet network, and receives the aforementioned reference time information.

Next, the structure of the transmission packet mentioned above is described. FIG. 11 shows the structure of a conventional packet. In FIG. 11, ten MPEG2-TSPs are encapsulated, and an 8-byte header containing information for identifying MPEG2-TSP and a time stamp to be used at the packet arrival is added to create a 1892-byte RTP packet. Then, an 8-byte UDP packet header is added to this RTP packet to create a 1900-byte UDP packet. Next, a 24-byte IP packet header is added to the UDP packet to create a 1924-byte IP packet. Finally, a 14-byte Ethernet header and 4-byte checksum are added to this IP packet to create a 1942 Ethernet packet.

In the communications network, MTU, the maximum transmission unit, is often limited. Accordingly, on the communications network, the packet is split when the size of the packet data to be transmitted exceeds MTU. This type of processing is called fragmentation in the Internet field.

In the prior art, MTU on the Ethernet communications network is 1500 bytes. Fragmentation on the communications network is not preventable because the data size of the data region in Ethernet packets exceeds MTU. Therefore, a packet which has lost its header information exists in some cases, but packet loss or jitter is difficult to compensate for after fragmentation at the receiving side.

Next, a conventional receiver is described. FIG. 8 shows a conventional configuration of a content receiver. FIG. 9 is a flowchart illustrating the operation of receiving and decoding a packet.

Receiver 71 receives an Ethernet packet from a communications network such as the Internet, and outputs the packet to the next step. FIG. 11 shows this Ethernet packet. Ethernet packet processor 72 executes Ethernet protocol processing on the Ethernet packet given to Ethernet packet processor 72, and outputs an UDP/IP packet to the next step. STEP 91 in FIG. 9 shows this processing, and S14 in FIG. 10 shows the output signal.

S14 in FIG. 10 shows that jitter and packet loss has occurred in a received UDP/IP packet as a result of transmission and receiving of the received UDP/IP packet via the Internet. In other words, a delay greater than a stationary delay has occurred in a packet containing VIDEO1 and DATA1. A delay smaller than a stationary delay has occurred in a packet containing VIDEO3 and AUDIO2.

Next, jitter and packet loss on the Internet are described with reference to FIG. 10. A stationary delay exists between the transmitting and receiving sides on the Internet. Ideally, all packets are transmitted with this stationary delay. In this case, no jitter or packet loss occurs. However, in the Internet in practice, jitter or packet loss occurs due to packets being allocated different routes, deletion of the packet in the gateway because of the inability to transmit the packet within a packet valid time, re-transmission of the packet, and so on. The stationary delay is intentionally not indicated in S14 to help understanding of jitter on a limited space. More specifically, a delay greater than the stationary delay occurs in the packet containing VIDEO1 and DATA1, and thus S14 is more delayed (later) than S13 in the indication. Delay of the packet containing VIDEO3 and AUDIO2 is smaller than the stationary delay, and thus this packet is more advanced (faster) than S13 in the indication.

A packet containing only VIDEO2 and AUDIO1 is lost. UDP/IP packet processor 73 shown in FIG. 8 executes UDP/IP protocol processing on the UDP/IP packet, and outputs RTP packet. STEP 2 in FIG. 9 shows this processing. S15 in FIG. 10 shows this output signal.

The Ethernet and UDP/IP protocol processing mentioned above are a known fact in Internet protocol, and thus their description is omitted here.

These communications protocols contain, in their header, information on how to process data protocols. Each protocol processing method is standardized, and the content receiver is likely to possess the applicable processing method in advance. Accordingly, the content receiver can process the data protocol after deleting the header by analyzing information on the protocol in the header.

RTP packet processor 79 obtains the header of each RTP packet from each RTP packet shown in FIG. 11. RTP packet processor 79 also obtains information on structure data included in the header. This information on data contents is information for identifying a format of data stored. Here, this information identifies that the data is aforementioned MPEG2-TSP.

RTP packet processor 79 also has a counter for counting a bus clock reproduced based on the reference time information in receiver 71. RTP packet processor 79 counts this bus clock, and outputs MPEG2-TSP to the next step (Step 93 in FIG. 9) after removing the header when a count matches the time stamp in the header. RTP packet processor 79 then confirms whether MPEG2-TSP is scrambled (Step 94 in FIG. 9). The MPEG2-TSP header has information on whether MPEG2-TSP is scrambled in an area outside of the scrambled area. Accordingly, descrambling is applicable after taking out MPEG2-TSP and confirming the information. A predetermined method is applicable by determining in advance which method to use at the receiving and transmitting sides, or confirming and recognizing table information received on the receiving side.

Descrambler 74 descrambles and outputs MPEG2-TSP in accordance with a method corresponding to the scrambling method determined at the transmitting side. Step 96 in FIG. 9 shows this process. S17 in FIG. 10 shows this output signal.

TS decoder 77 adjusts MPEG2-TSP to a form to which AV decoder 78 can execute AV decoding (Step 97 in FIG. 9). AV decoder 78 executes AV decoding on data input to AV decoder 78, and outputs decoded data (Step 98 in FIG. 9). In STEP 93 in FIG. 9, if the bus clock count and the time stamp in the header do not match, TS decoder 77 verifies their difference (STEP 95 in FIG. 9). If the difference is within a range that can be compensated by a buffer in the reproduction controller (not illustrated), TS decoder 77 stands by an extended TS packet in this buffer. If the difference exceeds the range that can be compensated by the buffer, TS decoder 77 controls to dispose of the applicable TS packet (Step 96 in FIG. 9).

In the above configuration, however, a packet loss which has occurred on the communications network cannot be compensated in real time at the receiver, and thus a decoding error is generated when the packet loss occurs.

In addition, the RTP time stamp for jitter compensation is generated by counting the bus clock which is not related to encoding or decoding of the content. Moreover, the reference time information used for generating the bus clock has insufficient accuracy relative to the jitter accuracy required during decoding. Still more, this reference time information is affected by jitter on the communications network. These cause insufficient accuracy in jitter compensation during decoding on the receiving side in some cases, generating a decoding error.

Furthermore, since the data size of the data region in the communications packet exceeds the MTU in the communications network, fragmentation in the communications network is not preventable, resulting in loss of header information. This makes it difficult to compensate for, on the receiving side, the packet loss and jitter that occurs after fragmentation.

DISCLOSURE OF INVENTION

The present invention relates to a receiver which receives and reproduces content made up of a stream of compressed transport packets from a transmitting party. This receiver includes a storage means for storing the content after receiving it and a reproducing means for reproducing the content stored in the storage means. If each transport packet forming the content is an extended transport packet that contains reproduction time instructing information generated using a system clock of the transport packet, the reproducing means reproduces each stored extended transport packet at the time obtained from the reproduction time instructing information.

Moreover, the present invention relates to a transmitter which transmits content made up of a stream of compressed transport packets. This transmitter includes a transmitting means for transmitting the content and a reproduction time instructing information generating means for generating reproduction time instructing information for indicating the time to reproduce the content in the storage means at the receiving party using the system clock of the transport packet. The transmitting means adds the reproduction time instructing information to each transport packet to be transmitted, and transmits an extended transport packet.

DETAILED DESCRIPTION OF PREFERRED EMBODIMENT(S)

First Exemplary Embodiment

Figure 1:
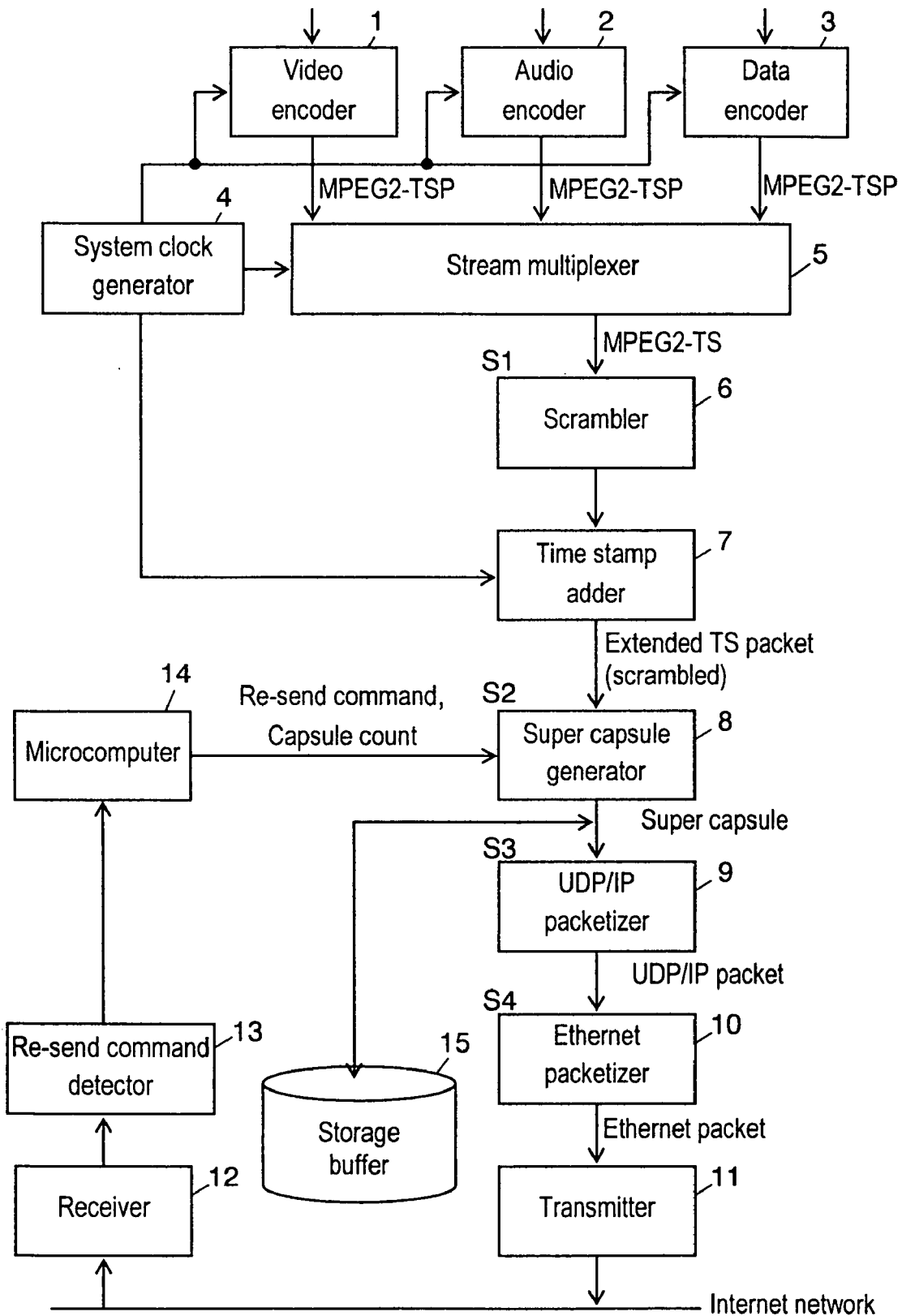
FIG. 1 is a block diagram of a content transmitter in accordance with a first exemplary embodiment of the present invention.
Figure 5:
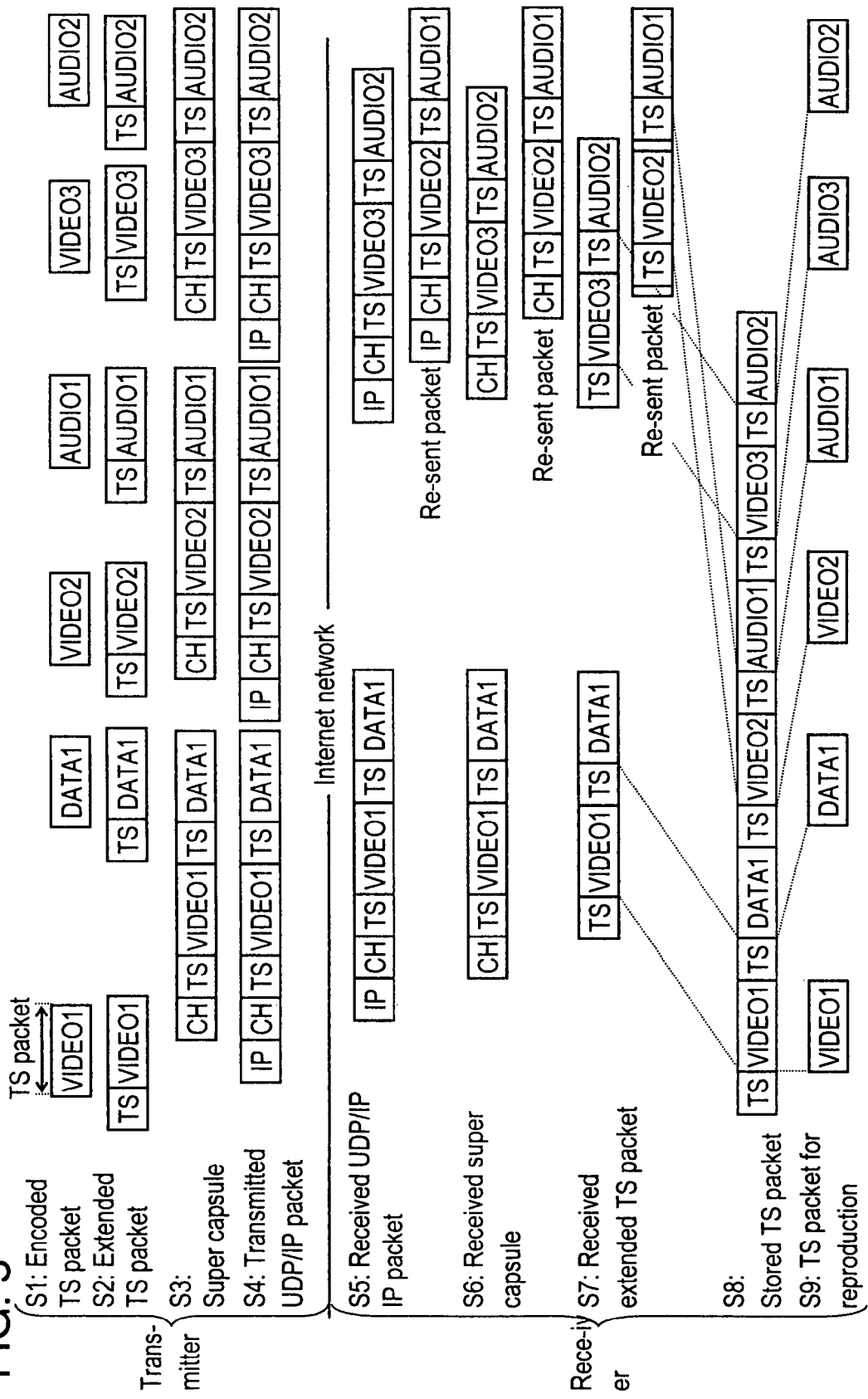
FIG. 5 illustrates a transition of a packet structure in accordance with the first exemplary embodiment of the present invention.
Figure 6:
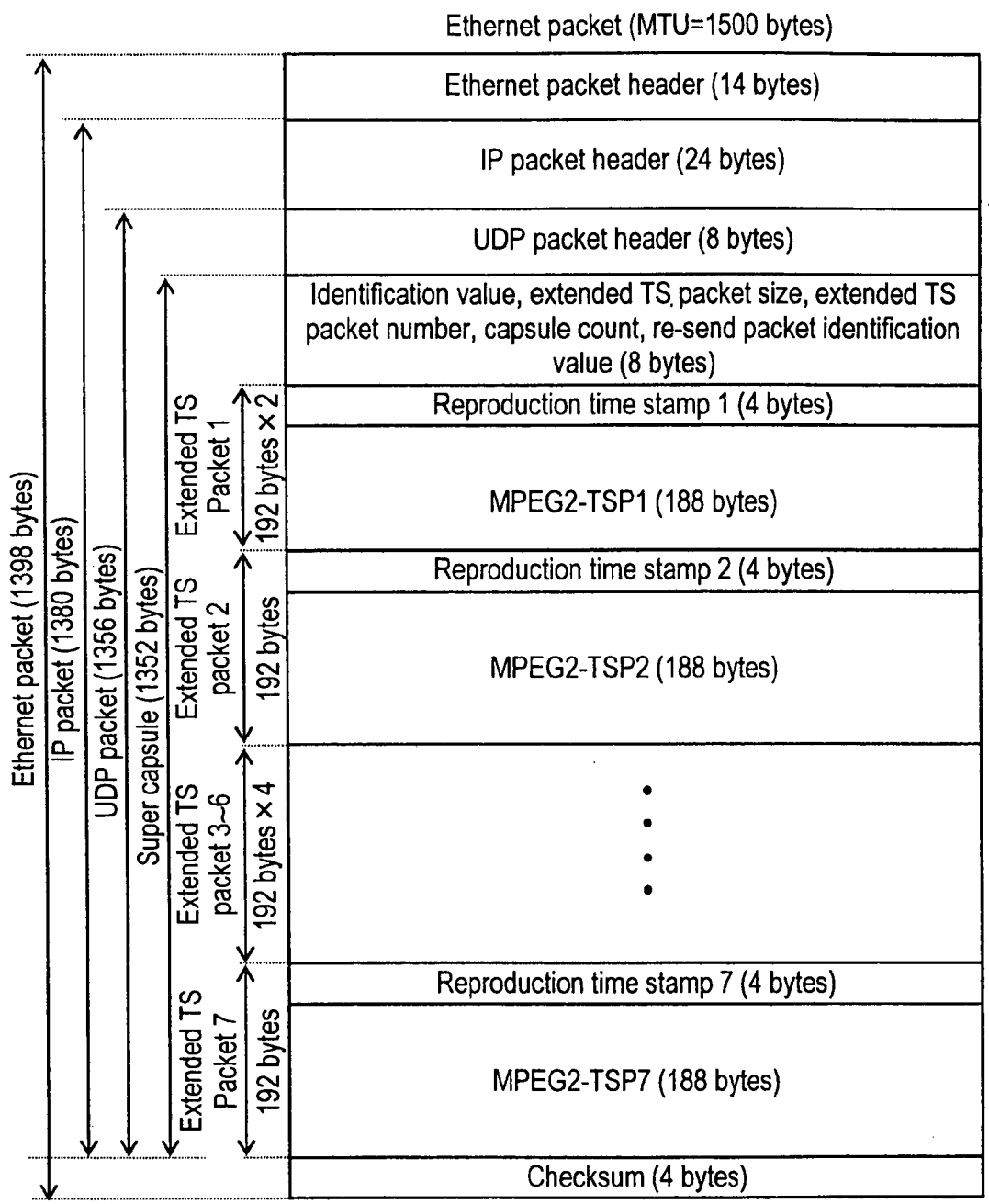
FIG. 6 is an Ethernet packet structure in accordance with the first exemplary embodiment of the present invention.
Figure 7:
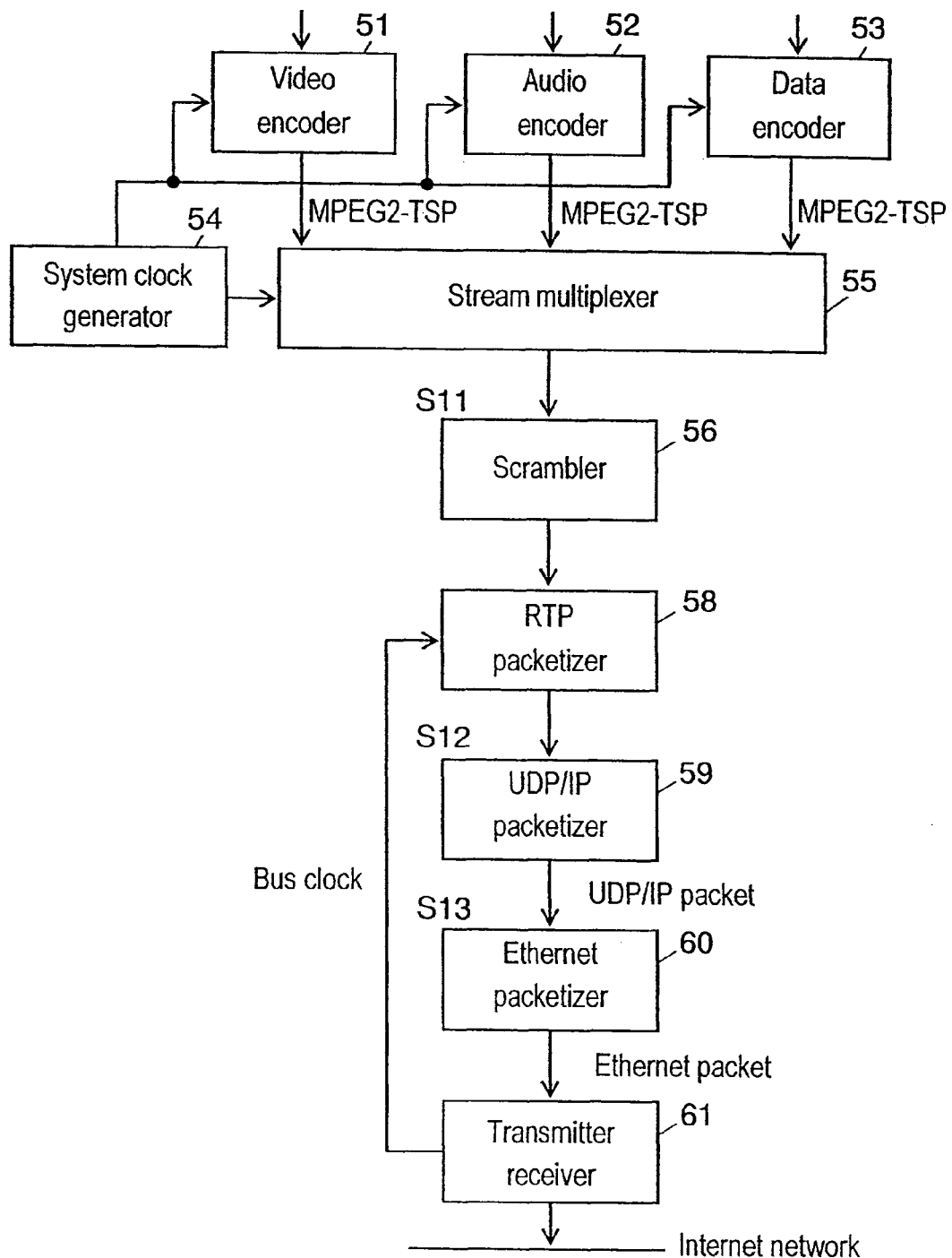
FIG. 7 is a block diagram of a conventional content transmitter.
Figure 8:
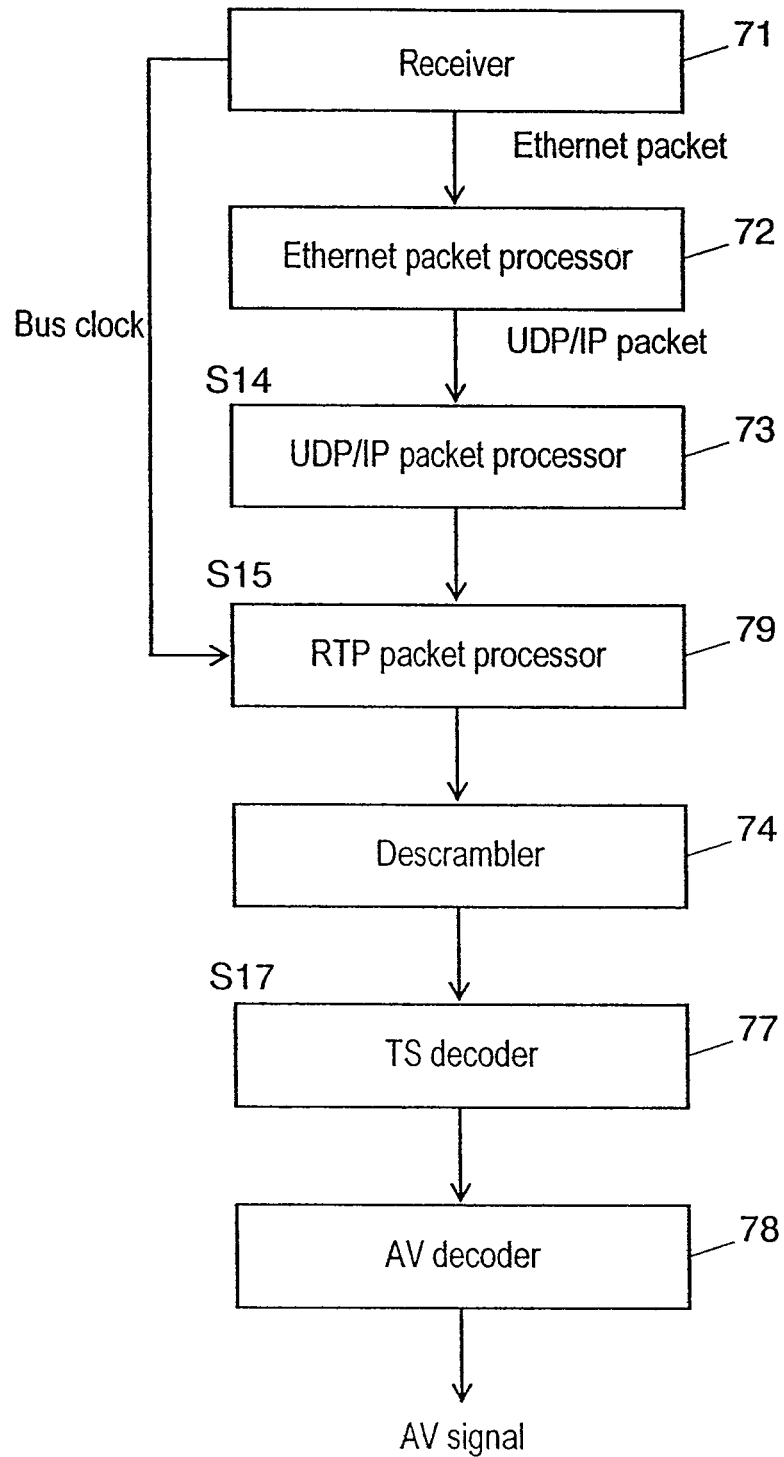
FIG. 8 is a block diagram of a conventional content receiver.
Figure 9:
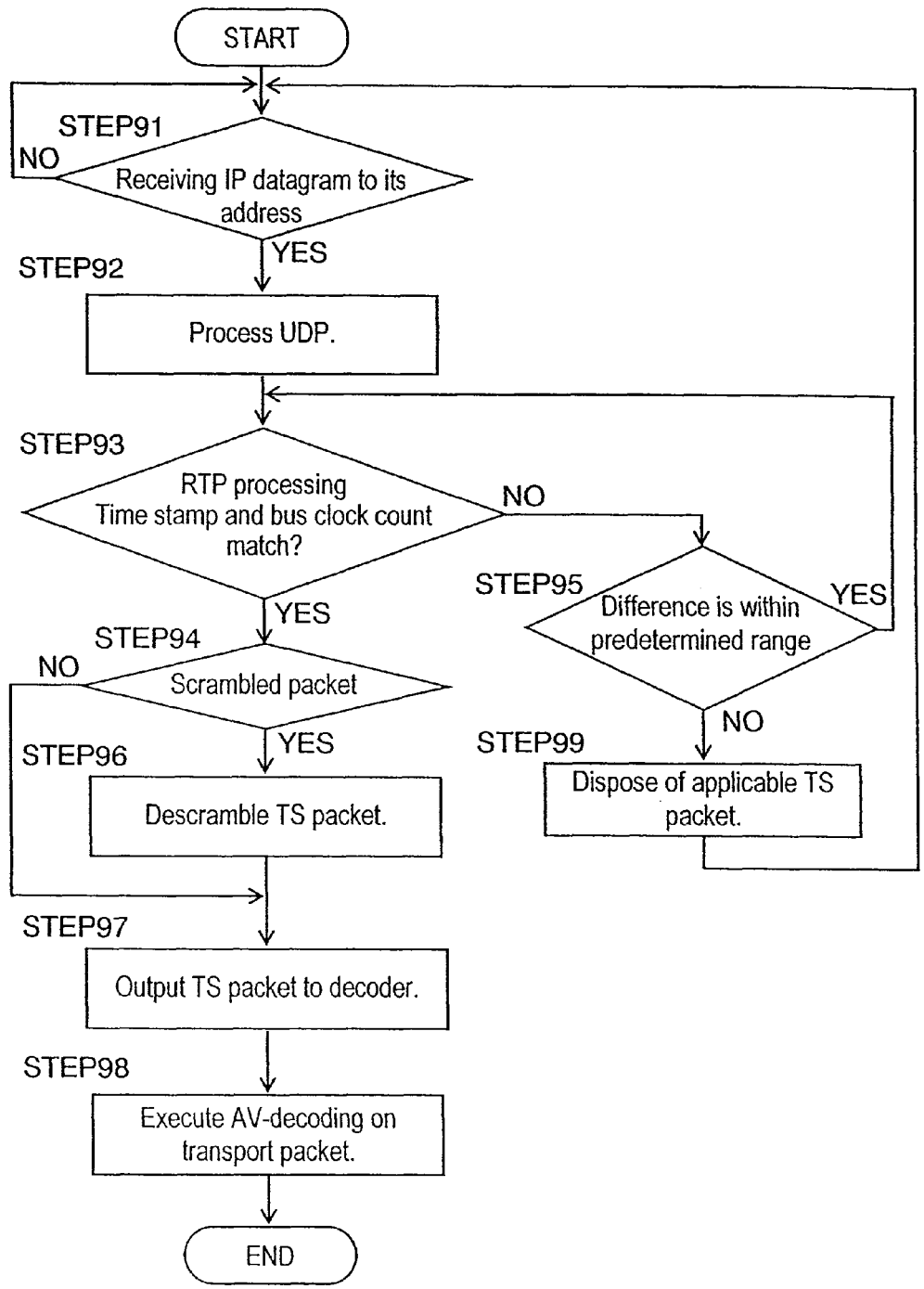
FIG. 9 is a flow chart illustrating an operation of the conventional content receiver.
Figure 10:
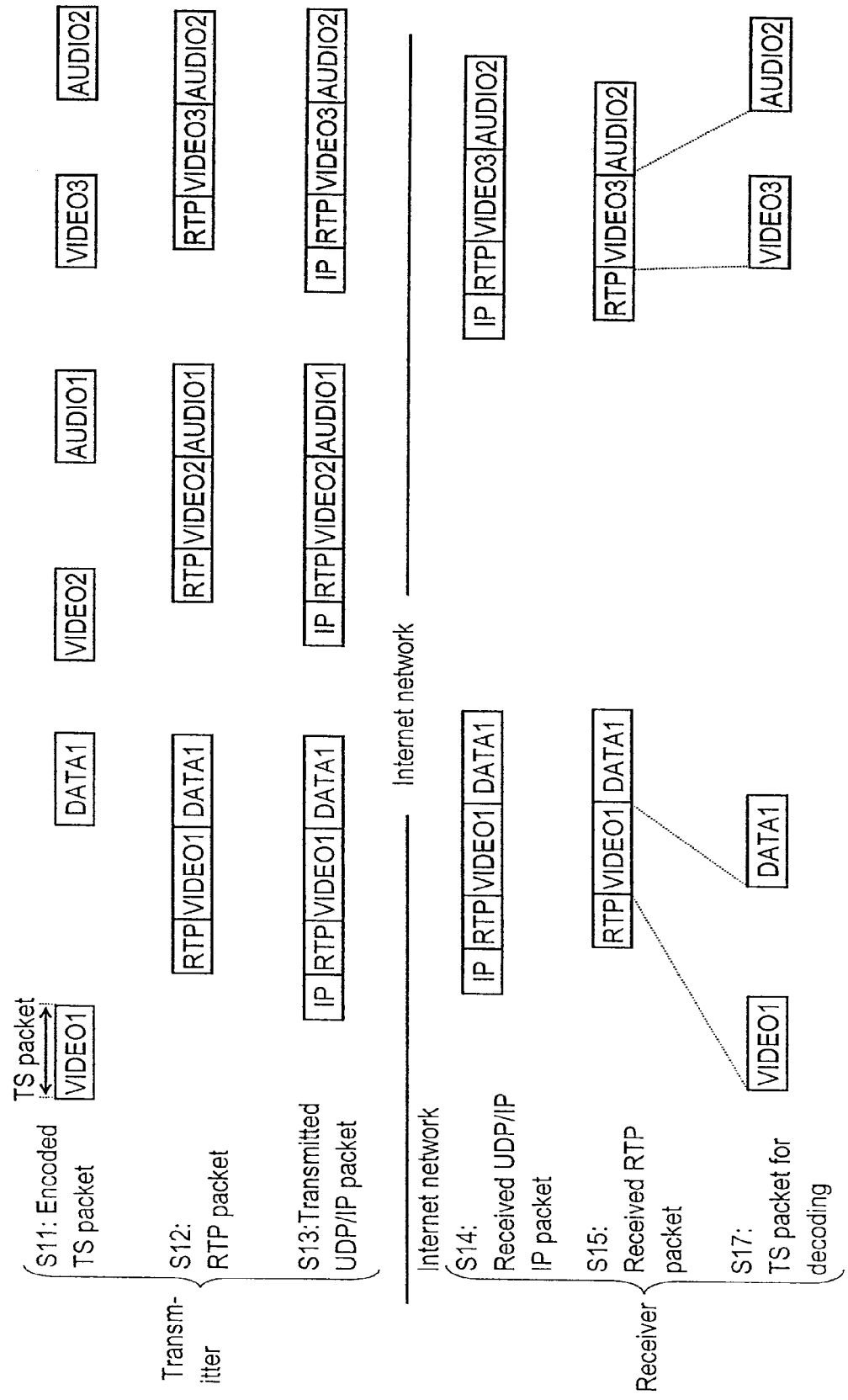
FIG. 10 illustrates a transition of a conventional packet structure.
Figure 11:
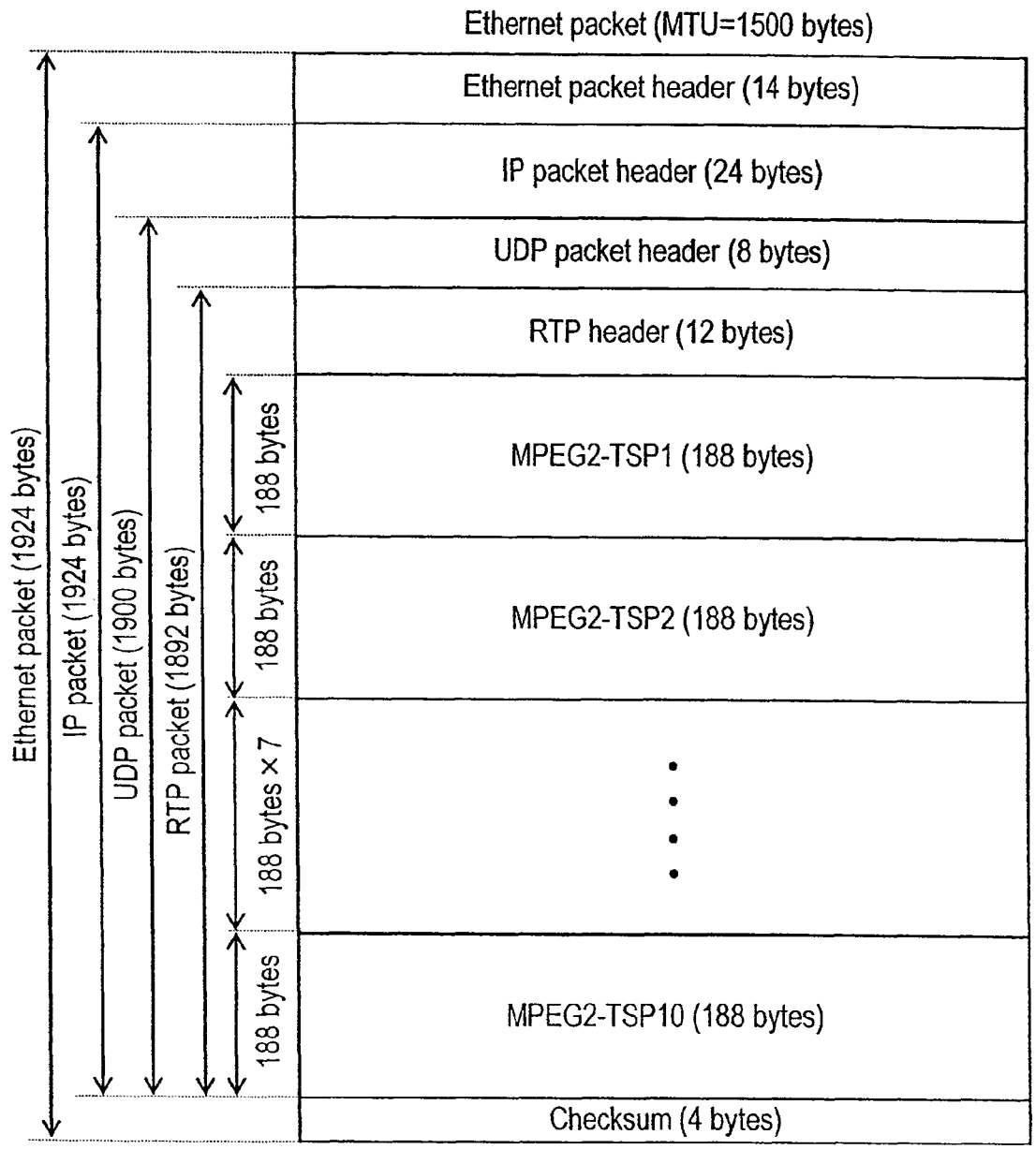
FIG. 11 illustrates the conventional packet structure.

FIG. 1 shows a configuration of a content transmitter in a first exemplary embodiment. FIG. 5 shows a transition of a packet structure of the content transmitter and a content receiver in the first exemplary embodiment. FIG. 6 shows the packet structure in the first exemplary embodiment.

In FIG. 1, microcomputer 14 controls each part of the content transmitter Video encoder 1 encodes signals using a predetermined compression format, and outputs an encoded video signal to the next step. The first exemplary embodiment describes an example of the MPEG2 format. The output from encoder 1 is composed of MPEG2-TSP. System clock generator 4 generates a 27 MHz clock signal. Video encoder 1 uses this 27-MHz clock as a system clock for encoding video signals. Audio encoder 2 encodes audio signals using the same compression format as video encoder 1, and outputs MPEG2-TSP signals to the next step.

Data encoder 3 encodes data such as data broadcasting and EPG data using the same compression format as video encoder 1, and outputs MPEG2-TSP signals to the next step.

Stream multiplexer 4 multiplexes the above three types of MPEG2-TSP on a time base. Stream multiplexer 4 also generates a PCR signal that reproduces the system clock on the receiving side periodically, using a counter for counting the system clock.

In the MPEG transport system, the PCR signal is generated at a cycle of about 50 ms. Stream multiplexer 4 further multiplexes the PCR signal into the aforementioned multiplexed signal, after encoding the PCR signal to MPEG2-TSP, and outputs an MPEG2-TS. S1 in FIG. 5 shows this output signal.

FIG. 5 shows a transition of packet multiplexing on the time base. In FIG. 5, the abscissa is time. Any stationary delay in each processing is ignored and thus not indicated in FIG. 5. VIDEO1, VIDEO2, VIDEO3, AUDIO1, AUDIO2, and DATA1 in S5 are packets multiplexed by stream multiplexer 5. VIDEO1, VIDEO2, and VIDEO3 in S1 are video-encoded MPEG2-TSPs. AUDIO1 and AUDIO2 in S1 are audio-encoded MPEG2-TSPs. DATA1 in S1 is data-encoded MPEG2-TSP. The PCR signal is a known fact in the MPEG2 system, and thus its description is omitted here.

Scrambler 6 encrypts MPEG2-TS using a predetermined encryption method, and outputs an encrypted signal. The first exemplary embodiment shows an example of the MULTI2 method. Time stamp adder 7 has a second counter for counting the system clock output from system clock generator 4, and includes this count in a header as the time stamp. The time stamp adder then adds this header to each MPEG2-TS (scrambled in this exemplary embodiment), and outputs it to the next step as an extended TSP packet. S2 in FIG. 5 shows this output signal, and TS in FIG. 5 shows the header containing this time stamp. At the receiving party, this time stamp is not used for obtaining the system clock. The receiving party ignores the packet generation timing at the transmitting party, and stores the packet in a storage device. The receiving party then uses this time stamp for obtaining the packet generation timing at the transmitting party (for reproducing MPEG2-TS) when reproducing the stored packet.

This counter and a counter for generating the PCR signal are synchronized, since they use the same system clock.

However, this counter is not synchronized with a counter in the receiving party in some cases. Accordingly, the frequency of the system clock, the maximum speed of the extended TS packet to be sent, and the minimum size of storage device 32 in the receiving party, which is described later, are predetermined so as to secure the time for reproduction at the receiving party. A bit number of this counter is set in a way such that all extended TS packets to be sent can be stored within the time that the counter goes around. In an example where all extended TS packets comprising the content are first stored in the receiving party and then reproduced, such as in the first exemplary embodiment, sufficient capacity for the storage device is secured, and thus no problem occurs with insufficient reproduction time at the receiving party.

On adding the time stamp, the counter is initialized at predetermined timing corresponding to the count of the PCR signal, and then time-stamped to synchronize the counter time-wise with the count used for generating the PCR signal. Or, this counter is initialized after a predetermined offset time, and then time-stamped. This allows the counter for reproducing the system clock using PCR at the receiving party also to be used as a counter for reproducing MPEG2-TS. In addition, the counter of the receiving party and this counter can be synchronized. In this case, it is preferable to match the bit number of this counter and the bit number of the counter for generating the PCR signal. Carry-over processing at the receiving party can thus be simplified.

Super capsule generator 8 encapsulates one or more of individual extended TS packets. The header containing information for identifying that encapsulated information is the extended TS packet, the length of extended TS packet in the capsule, the number of extended TS packets, and the capsule count is added to the output signal, and output to the next step as a super capsule. S3 in FIG. 5 shows this super capsule. CH in FIG. 5 shows the header. This capsule count is used for confirming the continuity of super capsules at the receiving party. The super capsule generator 8 increments the count of this capsule counter every time the super capsule is output from super capsule generator 8.

In FIG. 5, two extended TS packets are encapsulated, but this is just for illustrative purposes. The first exemplary embodiment does not limit the number of extended TS packets. Information in the header added to the super capsule is designed to store the information for confirming the content of encapsulated data and the continuity of capsules at the receiving party, and thus the form of information is not limited to the aforementioned style. For example, a capsule count can be included in information on the number of extended TS packets as the count of the extended TS packet. Or, the length of an extended TS packet and the number of extended TS packets can be the total encapsulated data length. Super capsule generator 8 outputs the super capsule to the next step and also to storage buffer 5.

Microcomputer 14 controls storage to storage buffer 15 using a ring buffer system. Microcomputer 14 manages a region for storing the super capsule in storage buffer 15 and the header information in each super capsule. Re-send command detector 13 detects a re-send command output from receiver 12. On controlling re-transmission of a super capsule, re-send command detector 13 outputs information for designating a super capsule which requires to be re-sent in the re-send command (at least a capsule count in this embodiment) and information for instructing re-transmission to microcomputer 14.

Microcomputer 14 reads out a super capsule corresponding to the capsule count from storage buffer 15, and then controls the output of UDP/IP packetizer 9 for re-transmitting the super capsule. In some cases, re-send information is further added to the header of the super capsule and then output. The counting range of the capsule counter is preferably the number of bits that can cover at least twice the maximum delay time on a communications network to be sent (delay until receiving the re-send command after transmitting the super capsule) in proportion to the transmission speed of the super capsule. In addition, the storage buffer size is preferably a capacity that can at least store the volume of super capsule equivalent to the counting range of the capsule counter. Any format for the re-send command previously determined with the receiving party is applicable, and thus the re-send command format is not particularly specified in this exemplary embodiment.

UDP/IP packetizer 9 stores each super capsule in an IP datagram for sending each capsule to an IP communications network, and adds an IP packet header to output the capsule as an IP packet. S4 in FIG. 5 shows this output signal. IP in S4 is a header in a communications protocol such as an IP header. The IP packet header is a known fact in the Internet field, and thus its description is omitted here. In this embodiment, the IP packet header is stored in the UDP packet, but this is not fundamentally required. Other protocols, such as storing the IP packet header in the TCP packet, are also applicable.

Ethernet packetizer 10 stores the IP packet input in Ethernet packetizer 10 in the Ethernet data region. Ethernet packetizer 10 also adds an Ethernet packet header and checksum to the IP packet, and outputs the packet as an Ethernet packet. The Ethernet packet header and checksum are known facts in the Internet field, and thus their description is omitted here.

Transmitter 11 transmits the Ethernet packet to the Internet network. Different common carriers administer communications networks in various methods on the Internet network, and transmitter 11 and receiver 12 support these different methods. Modes and specifications are not particularly limited.

Next, the transmission packet structure is described. FIG. 6 shows the Ethernet packet structure in this exemplary embodiment. In FIG. 6, seven extended TS packets each of which made up of MPEG2-TSP and 4-byte headers, including time stamp, are encapsulated. Then, an 8-byte header containing an identification value for identifying the extended TS packets, capsule counts, extended TS packet size, and the number of extended TS packets is added to form a 1352-byte super capsule. Then, an 8-byte UDP packet header is further added to the super capsule to form a 1356-byte UDP packet.

Still more, a 24-byte IP packet header is added to the UDP packet to make a 1380-byte IP packet. Finally, a 14-byte Ethernet header and 4-byte checksum are added to the IP packet to complete a 1398-byte Ethernet packet.

In the communications network, MTU, the maximum transmission packet unit, is often limited. When the size of packet data to be sent exceeds MTU, the packet is often split on the communications network. In the Internet field, this processing is called fragmentation. Compensation for packet loss and jitter which have occurred after fragmentation is difficult at the receiving party because header information is lost. Accordingly, in the first exemplary embodiment, the number of extended TS packets in the super capsule is set to seven capsules to prevent the data size of the Ethernet packet data region exceeding MTU 1500 bytes on the Ethernet communications network.

The data size of MPEG2-TSP is fixed at 188 bytes in accordance with the specification of the encoder. The data size of the extended TS packet thus becomes 192 bytes. This means that the maximum number of extended transport packets that can be stored in the super capsule and also falls within MTU1500 bytes on the Ethernet communications network is seven packets.

The setting of the number of extended TS packets in the super capsule in accordance with MTU on the communications network prevents fragmentation on the communications network. Furthermore, the addition of the aforementioned capsule count and the provision of the re-send function allow compensation for the packet loss at the receiving party.

Communications networks are not limited to Internet using Ethernet connections. For example, USB and wireless communications networks, such as mobile phones are also supported. The MTU is also adjustable to values that suit these communications networks. The compression format is also not limited to MPEG2. For example, MPEG4 and other formats are acceptable.

Figure 2:
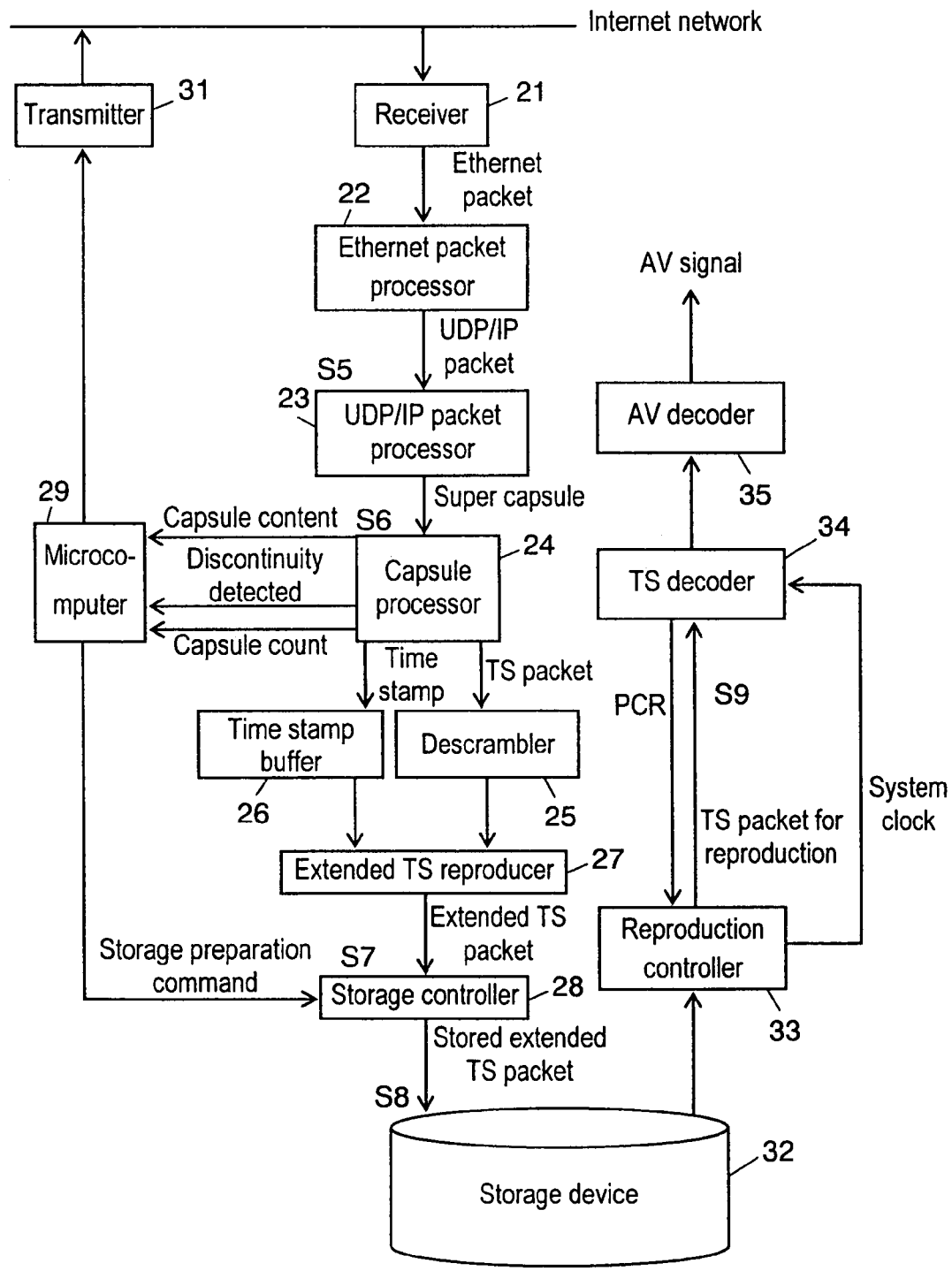
FIG. 2 is a block diagram of a content receiver in accordance with the first exemplary embodiment of the present invention.
Figure 3:
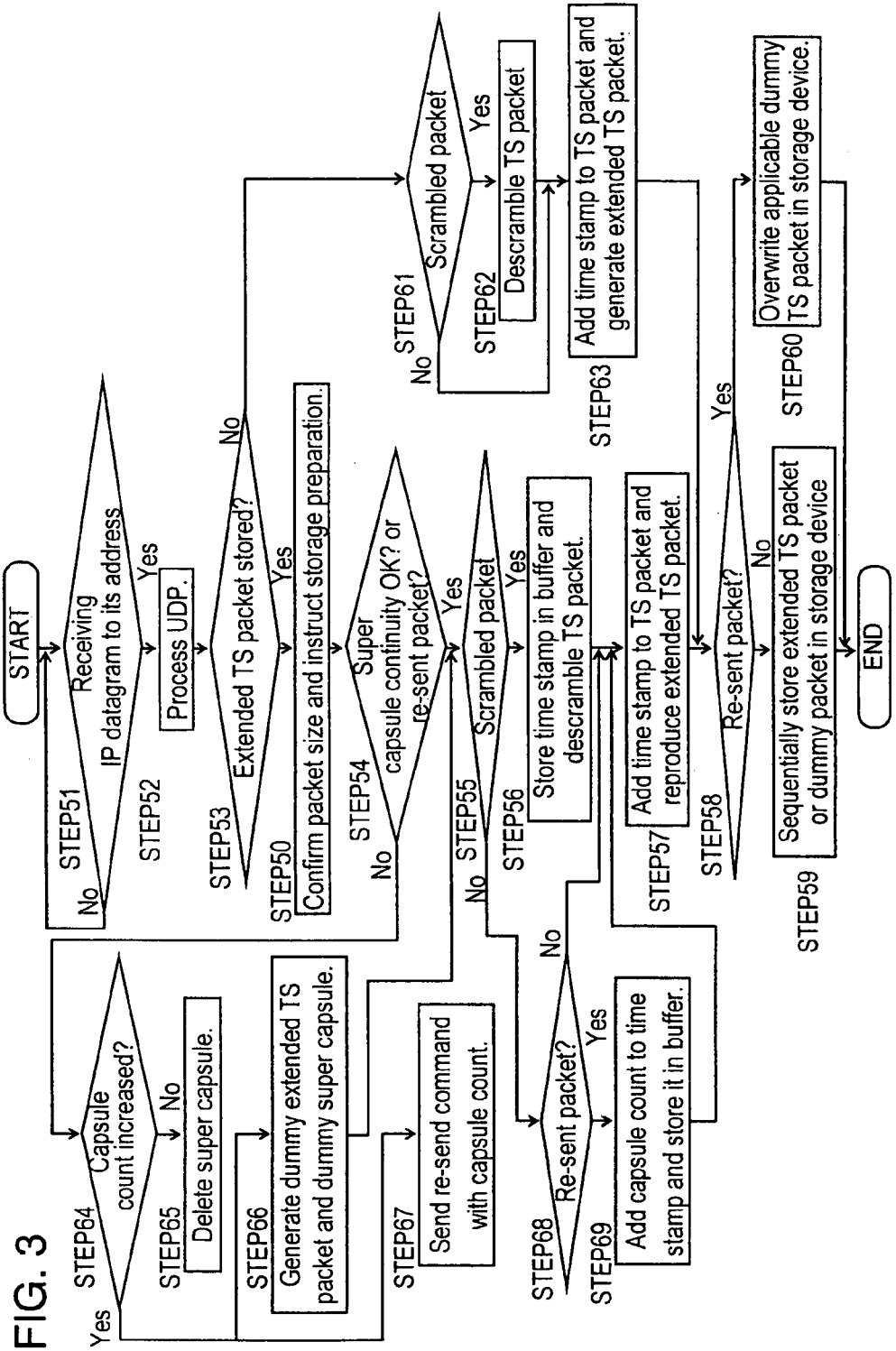
FIG. 3 is a flow chart illustrating a first operation of the content receiver in accordance with the first exemplary embodiment of the present invention.
Figure 4:
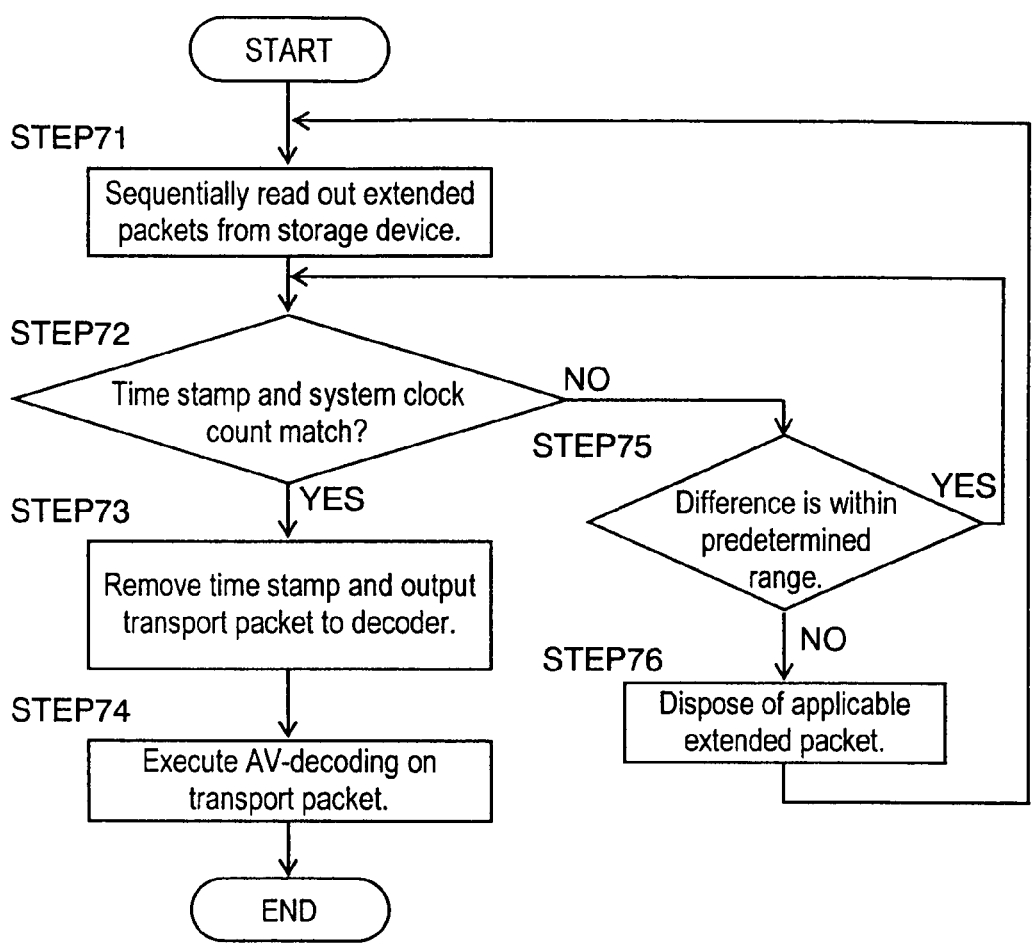
FIG. 4 is a flow chart illustrating a second operation of the contents receiver in accordance with the first exemplary embodiment of the present invention.

Next, an example of the receiving party in the first exemplary embodiment is described. FIG. 2 shows the configuration of the content receiver in the first exemplary embodiment. FIG. 3 is a flowchart illustrating the operation from receiving and storing each packet. FIG. 4 is a flowchart illustrating reproduction after storing the packet.

In FIG. 2, microcomputer 29 controls each part of the content receiver. Receiver 21 receives and outputs an Ethernet packet shown in FIG. 6 from a communications network such as the Internet network. A wide range of common carriers administer communications networks in various methods on the Internet network; and receiver 21 and transmitter 31, described later, support these methods. Modes and specifications of these networks are not particularly limited. The communications network is not limited to Internet connections. USB and wireless communication networks, such as mobile phones, are also supported.

Ethernet packet processor 22 executes Ethernet protocol processing on the Ethernet packet given to Ethernet packet processor 22, and outputs an UDP/IP packet (STEP 51 in FIG. 3 shows this processing, and S5 in FIG. 5 shows this output signal).

S5 in FIG. 5 indicates that jitter and packet loss have occurred as a result of receiving the UDP/IP packet via the Internet. In other words, a delay greater than a stationary delay has occurred in a packet containing VIDEO1 and DATA1. A delay smaller than a stationary delay has occurred in a packet containing VIDEO3 and AUDIO 2. A packet containing VIDEO2 and AUDIO1 has once become a packet loss, and re-sent.

Next, jitter and packet loss on the Internet are described next with reference to FIG. 5. A stationary delay exists between the transmitting and receiving parties on the Internet network. Ideally, all packets are transmitted with this stationary delay. In this case, no jitter or packet loss occurs. However, in the Internet in practice, jitter or packet loss occurs due to a packet being allocated different routes, deletion of the packet at the gateway because of the inability to transmit the packet within a packet valid time, or re-transmission of the packet. A stationary delay is intentionally not indicated in S5 to help understanding of jitter on a limited space. More specifically, a delay greater than the stationary delay occurs in a packet containing VIDEO1 and DATA1, and thus this packet is indicated slower (looks more delayed) than S4. A delay smaller than the stationary delay occurs in the packet containing VIDEO3 and AUDIO2, and thus this packet is faster (looks more advanced) than S4. In the Figure, the packet containing VIDEO2 and AUDIO1 represents a packet loss, and then re-transmitted.

UDP/IP packet processor 23 in FIG. 2 executes UDP/IP protocol processing on the UDP/IP packet, and outputs a super capsule (STEP 52 in FIG. 3 shows this processing, and S6 in FIG. 5 shows this output signal.)

The Ethernet and UDP/IP protocol processing are known facts in the Internet field, and thus their description is omitted here. Processing of the Ethernet packet and UDP packet is not limited to the way described in this exemplary embodiment. Other forms of protocol processing are executed in accordance with the type of a packet received and specifications of each communications network. Other communications protocol processing is also applicable.

Information on a protocol processing method to be applied to the data is included in each header of these communications protocols. Protocol processing methods are standardized, and the content receiver can be provided with the applicable processing method in advance. Accordingly, the content receiver can process the data protocol after deleting the header by analyzing information on the protocol in the header.

Capsule processor 24 obtains the header of each super capsule from each super capsule shown in FIG. 6. Capsule processor 24 also outputs information on the data content structure included in this header to microcomputer 29. This information on the data content is information that identifies the format type of encapsulated data (in this example, information for identifying that the data is an extended TS packet). The information on this data content also includes the length of the extended TS packet in the capsule and the number of extended TS packets. Information providing the length of extended TS packet and the number of extended TS packets can also be the total length of encapsulated data.

Microcomputer 29 interprets given information on data content, and recognizes that the encapsulated data is an extended TS packet (Step 53 in FIG. 3). Microcomputer 29 also recognizes the size of each extended TS packet, and secures a storage region in storage device 32. Microcomputer 29 also begins preparation, including the setting of storage packet size and address initialization setting for storing each extended TS packet, in storage controller 28 (Step 50 in FIG. 3). These preparations can also be implemented when the first super capsule is input or when information on data content is changed.

Capsule processor 24 also monitors the capsule counter in the header for confirming continuity (Step 54 in FIG. 3). Capsule processor 24 detects the capsule count in each super capsule to check for a break in continuity. If capsule processor 24 detects a break in continuity, discontinuity is verified through a change in the capsule counter (Step 64 in FIG. 3).

If this discontinuity involves the same or in the direction of decrease of the capsule count, capsule processor 24 deletes super capsules detected after the discontinuity until a capsule count larger than the capsule count immediately before the discontinuity starts is found so as to solve the discontinuity (Step 65 in FIG. 3).

If the discontinuity is in the direction of increase of the capsule count, capsule processor 24 does not delete super capsules which contain such discontinuity. Instead, capsule processor 24 notifies microcomputer 29 that it has detected a break in continuity, and outputs to microcomputer 29 the capsule count of applicable super capsules which have not been received.

In addition, capsule processor 24 also generates a dummy super capsule consisting of a dummy extended TS packet provided with a dummy header. Capsule processor 24 then inserts this dummy super capsule in a time space that would otherwise have been occupied by the missing super capsule, and outputs it to the next step (Step 66 in FIG. 3). This simplifies the insertion of a re-sent packet in a later step.

Microcomputer 29, receiving notification from capsule processor 24, outputs a re-send command for instructing re-transmission of the super capsule. Here, microcomputer 29 generates the re-send command using a capsule count of the applicable super capsule which capsule processor 24 could not have received (Step 67 in FIG. 3). Transmitter 31 transmits the re-send command to the transmitting party through a communications network such as the Internet network via Ethernet.

The super capsule re-sent from the transmitting party includes information on re-transmission in its header, and thus this capsule can be detected at capsule processor 24. Accordingly, capsule processor 24 excludes this capsule from verifying discontinuity, and outputs the capsule untouched to the next step (Step 54 in FIG. 3).

Microcomputer 29 does not need to control the transmission of the re-send command immediately after receiving notification on discontinuity from capsule processor 24. Microcomputer 29 controls the transmission of the re-send command if an applicable super capsule is not received within a predetermined time after instructing capsule processor 24 to stand by to receive the super capsule which has not been detected. If the applicable super capsule is received within a predetermined time after instructing standby for reception, capsule processor 24 adds information indicating a re-sent packet to an applicable header and outputs it to the next step. This is to apply the same processing as to the re-sent packet in later steps. To avoid erroneous operation, the standby time should preferably be set shorter than the time that the count completes one cycle, and longer than the maximum delay time for packet arrival on the communications network. Confirmation of discontinuity and processing control after confirmation in STEP 54 and STEP 64 are executed via either capsule processor 24 or software in microcomputer 29.

Next, capsule processor 24 separates encapsulated extended TS packets and outputs each packet under the control of microcomputer 29. At this point, each MPEG2-TSP and header, including the time stamp, are separated and output, taking account of the fact that the MEPG2-TSP in the extended TS packet is scrambled or if it is a re-sent packet. Microcomputer 29 confirms whether or not the MPEG2-TSP is scrambled (Step 55 in FIG. 3).

The header of MPEG2-TSP has information on scrambling in the header out of the scrambled region. Accordingly, microcomputer 29 first retrieves the MPEG2-TSP, confirms this information, and executes descrambling of the scrambled region. Any method is applicable by determining in advance, between the receiving and transmitting parties, which method to be used, or by confirming and recognizing the received table information at the receiving party.

Descrambler 25 descrambles the MPEG2-TSP input to descrambler 25 using a method corresponding to scrambling at the transmitting party, and outputs the descrambled MPEG2-TSP to the next step. The header including the time stamp is delayed in time stamp buffer 26 for the processing time required in descrambler 25 to synchronize time-wise with the MPEG2-TSP, and then is output to the next step (Step 56 in FIG. 3).

Microcomputer 29 also checks whether the packet is a re-sent packet (Step 68 in FIG. 3). The re-sent packet has information on re-transmission in its header. Accordingly, microcomputer 29 confirms whether the packet is re-sent by checking this information. In case of a re-sent packet, microcomputer 29 generates the header to which re-send information and capsule count are added in addition to the time stamp, and outputs the packet to time stamp buffer 26 (Step 69 in FIG. 3).

Extended TS reproducer 27 binds MPEG2-TS and header to reproduce and output an extended TS packet. This processing is indicated in Step 57 in FIG. 3. This output signal is S7 in FIG. 5. Storage controller 28 confirms the header information to check whether the extended TS packet is re-obtained due to delay or loss on the communications network (STEP58 in FIG. 3). If the packet is not re-sent, an extended TS packet is sequentially written in a controlled region in storage device 32 (Step 59 in FIG. 3) under the control of microcomputer 29. If it is a re-sent packet, a dummy extended TS packet and dummy super capsule are generated in Step 66. Then, a re-obtained extended TS packet overwrites the dummy extended TS packet already stored (Step 60 in FIG. 3).

The re-sent extended TS packet includes the capsule count, and microcomputer 29 controls the capsule count and address of storage device 32. In this overwriting control, the re-sent extended TS packet is stored in an original storage region (a region reserved by first storing the dummy extended TS packet) to secure continuity in the storage device 32 (S8 in FIG. 5).

A re-sent extended TS packet of VIDEO2 and AUDIO1 is stored at its original region in S8 in FIG. 5. In storage device 32, extended TS packets can be stored efficiently because they are stored without reference to the arrival time or transmission time at the transmitting party.

Storage device 32 can be any storage medium, including HDDs and DVDs. A semiconductor memory is also applicable. If the re-sent control is simplified by just controlling jitter compensation, the capacity required for storage device 32 can be reduced to a region for storing all extended TS packets received in one cycle of the counter described later.

In FIG. 3, microcomputer 29 confirms that the extended TS packet is not stored in STEP 53. For example, in the case of a normal MPEG2-TSP, it is checked in the same way whether the packet is scrambled (STEP 61 in FIG. 3). Then, if it is scrambled, descrambling is executed by descrambler 25 (STEP 62 in FIG. 3). Extended TS reproducer 27 then generates and adds the header including the time stamp, and outputs an extended TS packet (STEP 63 in FIG. 3). In the same way, this packet is stored in storage device 32. The subsequent reproduction process can be shared. In this case, however, jitter compensation and packet loss compensation become the same as in the prior art.

Next, reproduction is described. Reproduction controller 33, which is system clock reproducing means, has a first counter for counting the system clock. Reproduction controller 33 controls the frequency of the system clock in a way such that the comparison result of the count of this counter and the PCR signal output from TS decoder 34 become equivalent. In other words, a conventional MPEG transport system can be used in unmodified form for reproducing the system clock. Accordingly, in reproduction, specifications for the MPEG transport system can readily be satisfied by using the prior art. Reproduction controller 33, under the control of microcomputer 29, sequentially reads out the extended TS packets stored in storage device 32 while synchronizing with the system clock (STEP 71 in FIG. 4).

Reproduction controller 33 then removes the header including the time stamp at a timing in which each time stamp and aforementioned count match after a predetermined offset (STEP 72 in FIG. 4). Reproduction controller 33 then outputs each MPEG2-TSP to the next step. STEP 73 in FIG. 4 shows this processing. S9 in FIG. 5 shows this output signal.

Now, MPEG2-TS in the transmitting party is reproduced, and jitter which has occurred on the communications network is compensated. At the transmitting party, the counter for counting the PCR signal and the counter for counting the time stamp are synchronized. Accordingly, reproduction controller 33 can compare the count obtained from the PCR signal and the time stamp.

TS decoder 34 adjusts the MPEG2-TSP to a form to which AV decoder 35 can execute AV decoding, and outputs the data. AV decoder 35 executes AV decoding on data input to AV decoder 35, and outputs decoded data. In STEP 72, if the time stamp and system clock count do not match, reproduction controller 33 verifies the difference (STEP 75 in FIG. 4). Then, if this difference is within a range that can be jitter-compensated in a buffer (not illustrated) in reproduction controller 33, an extended TS packet stands by in the buffer. If this difference exceeds the range that can be jitter-compensated in the buffer in the reproduction controller, an applicable extended TS packet is disposed of (STEP 76 in FIG. 4).

Next, the structure of a received packet is described. In FIG. 6, the number of extended TS packets in a super capsule shows the case of receiving seven Ethernet packets (1398 bytes).

Data region has a 1356-byte UDP/IP packet, and this data region further has a 1352-byte super capsule. In the super capsule, seven extended TS packets each of which consists of a MPEG2-TSP and 4-byte header including the time stamp are encapsulated. The super capsule also has an 8-byte header including an identification value for identifying extended TS packet, a capsule count, an extended TS packet size, and the number of extended TS packet.

The communications network often limits MTU which is the maximum transmission packet unit. When the size of packet data exceeds this MTU, the packet is often split on the communications network.

In the Internet field, this processing is called fragmentation, and it is difficult for the receiving party to independently compensate for packet loss or jitter which has occurred after fragmentation. Accordingly, this exemplary embodiment sets the number of extended TS packet in the super capsule to seven. This is the number to prevent the data size of the Ethernet packet data region exceeding MTU 1500 bytes on the Ethernet communications network.

The data size of MEPG2-TSP is fixed to 188 bytes in accordance with the specification of the encoder. The data size of the extended TS packet thus becomes 192 bytes. This means that the maximum number of extended transport packets that can be stored in a super capsule and also falls within MTU1500 bytes on the Ethernet communications network is seven packets.

By preventing fragmentation in this way, re-transmission of a lost packet can be requested using the capsule count added to each super capsule when the packet loss occurs on the communications network. The packet loss is then compensated, using a capsule count, at storing the re-sent packet in the storage device.

Jitter which occurs on the communications network is compensated accurately at reproduction based on the accuracy of the system clock by using the time stamped for reproduction included in each extended TS packet. Compensation is further ensured and becomes more efficient by relatively controlling jitter compensation by controlling decoding timing at the content transmitter and content receiver, as described above, and packet loss compensation by controlling re-transmission.

The communications network is not limited to the Internet using Ethernet. For example. USB and wireless communications network such as mobile phones are also supported. The compression format is also not limited to MPEG2. For example, MPEG4 or other methods are acceptable.

Reproduction controller 33 outputs MPEG2-TSP from the content receiver to an AV decoder connected to the bus in some cases. In this case, reproduction controller 33 is connected to an external output interface such as an IEEE1394 interface (not illustrated). The MPEG2-TSP is stored in an isochronous packet determined by the interface.

TS decoder 34 can also be connected to an external output interface such as an IEEE1394 interface (not illustrated), and the output of TS decoder 34 can be sent to an external AV decoder. In this case, the external output interface stores and outputs MPEG2-TSP in an isochronous packet determined by the interface standard.

Second Exemplary Embodiment

Figure 12:
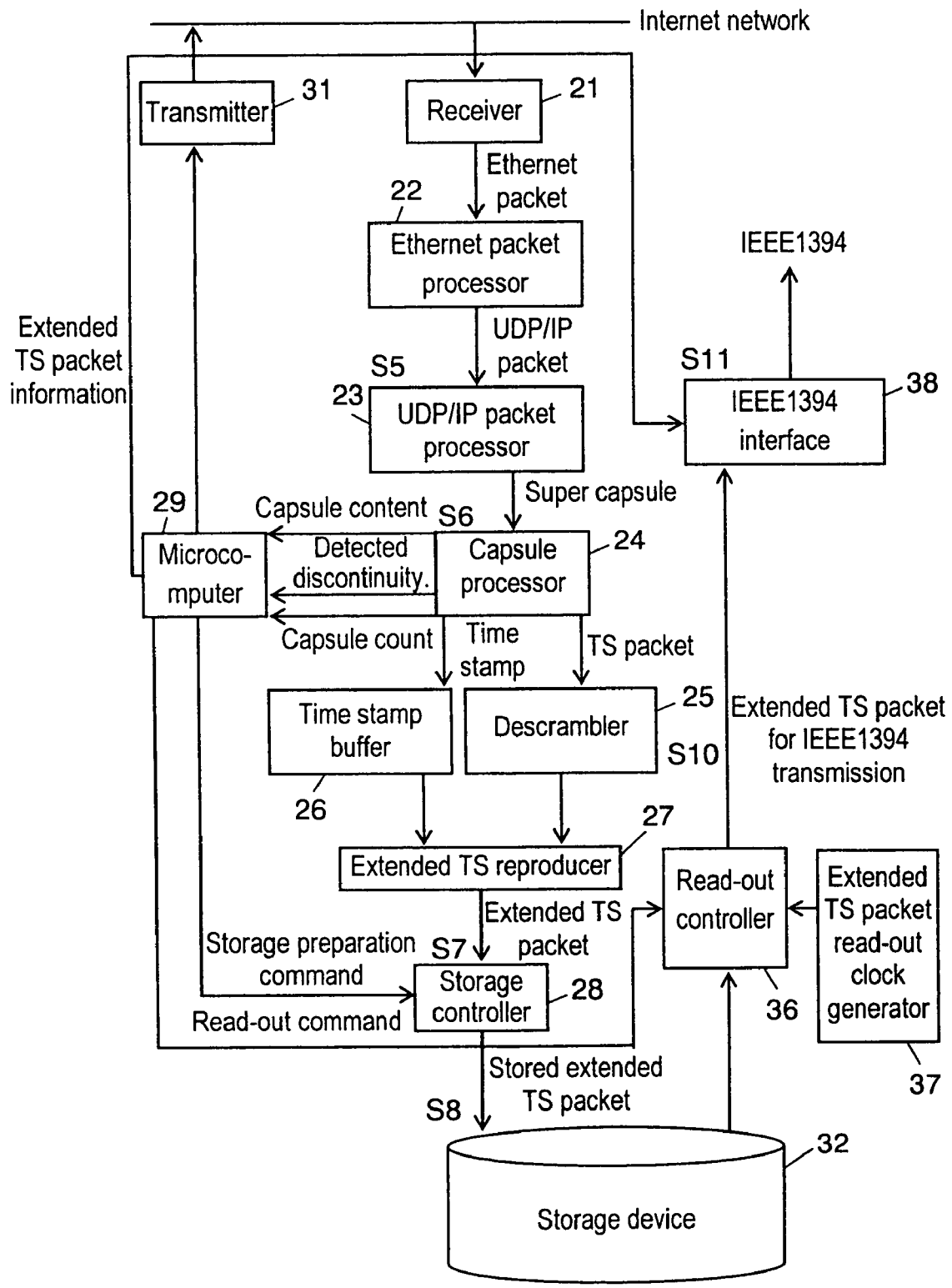
FIG. 12 is a block diagram of a content receiver in accordance with a second exemplary embodiment of the present invention.
Figure 13:
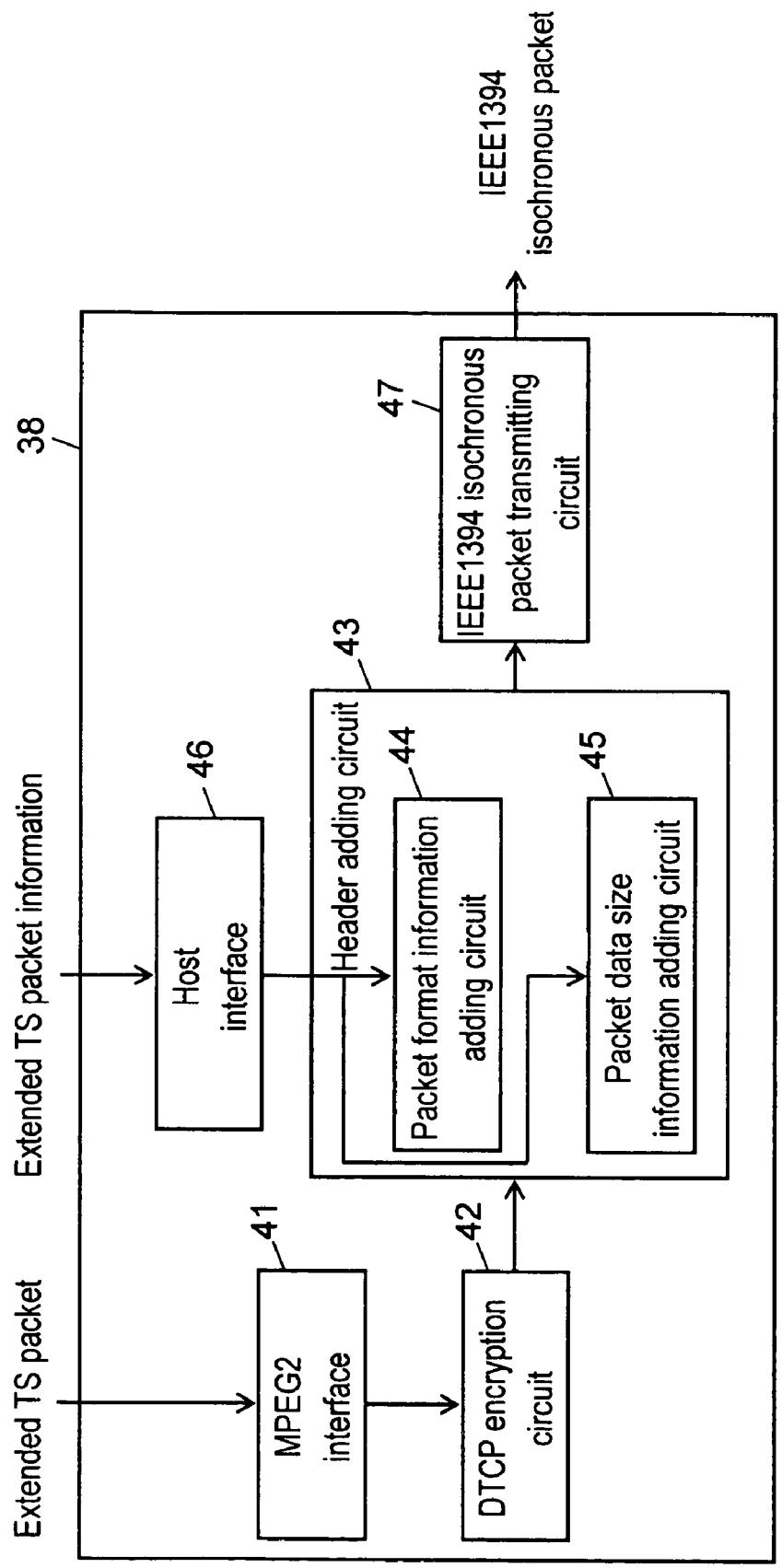
FIG. 13 is a block diagram of an IEEE1394 interface of the content receiver in accordance with the second exemplary embodiment of the present invention.
Figure 14:
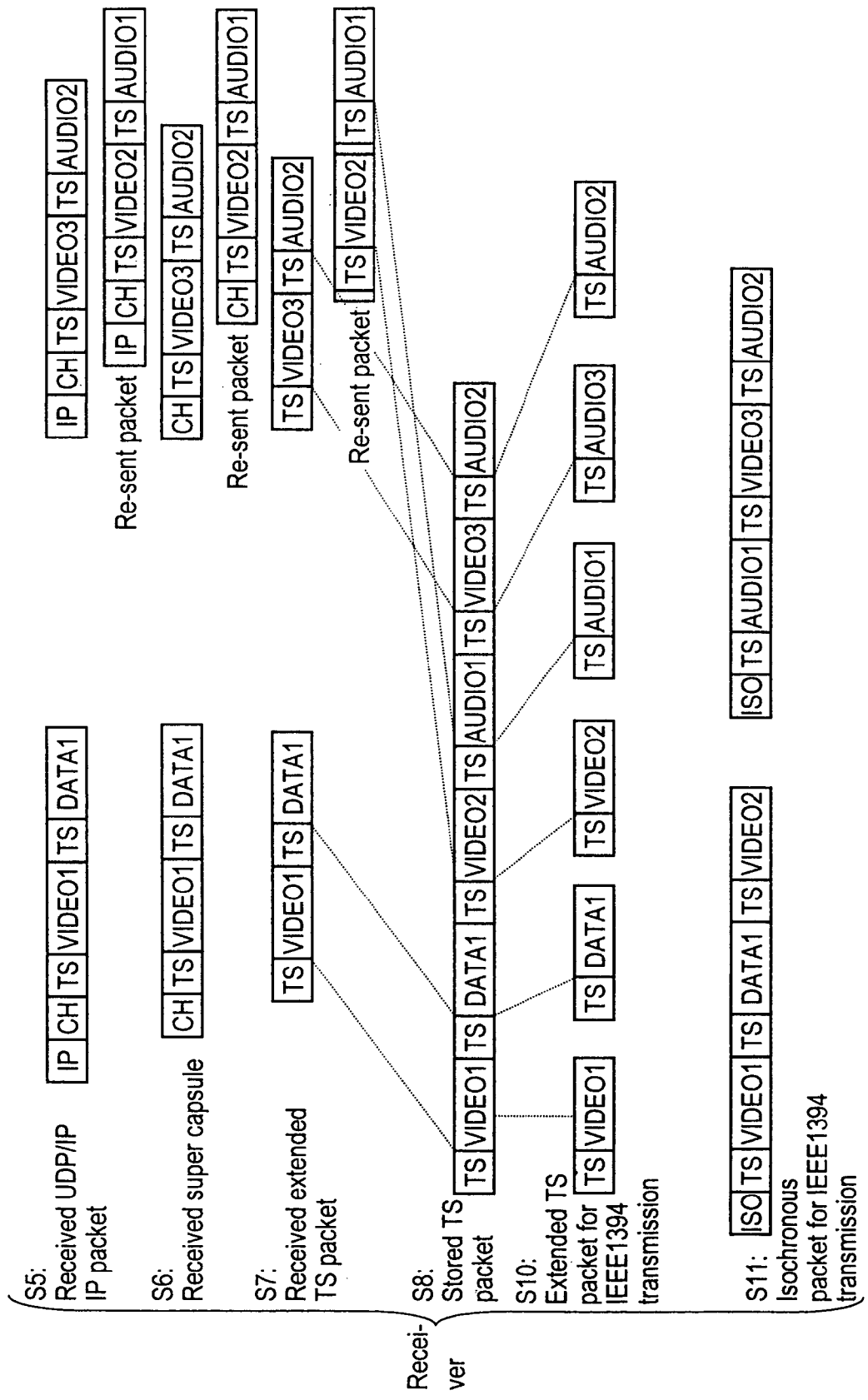
FIG. 14 illustrates a transition of a packet structure in accordance with the second exemplary embodiment of the present invention.
Figure 15:
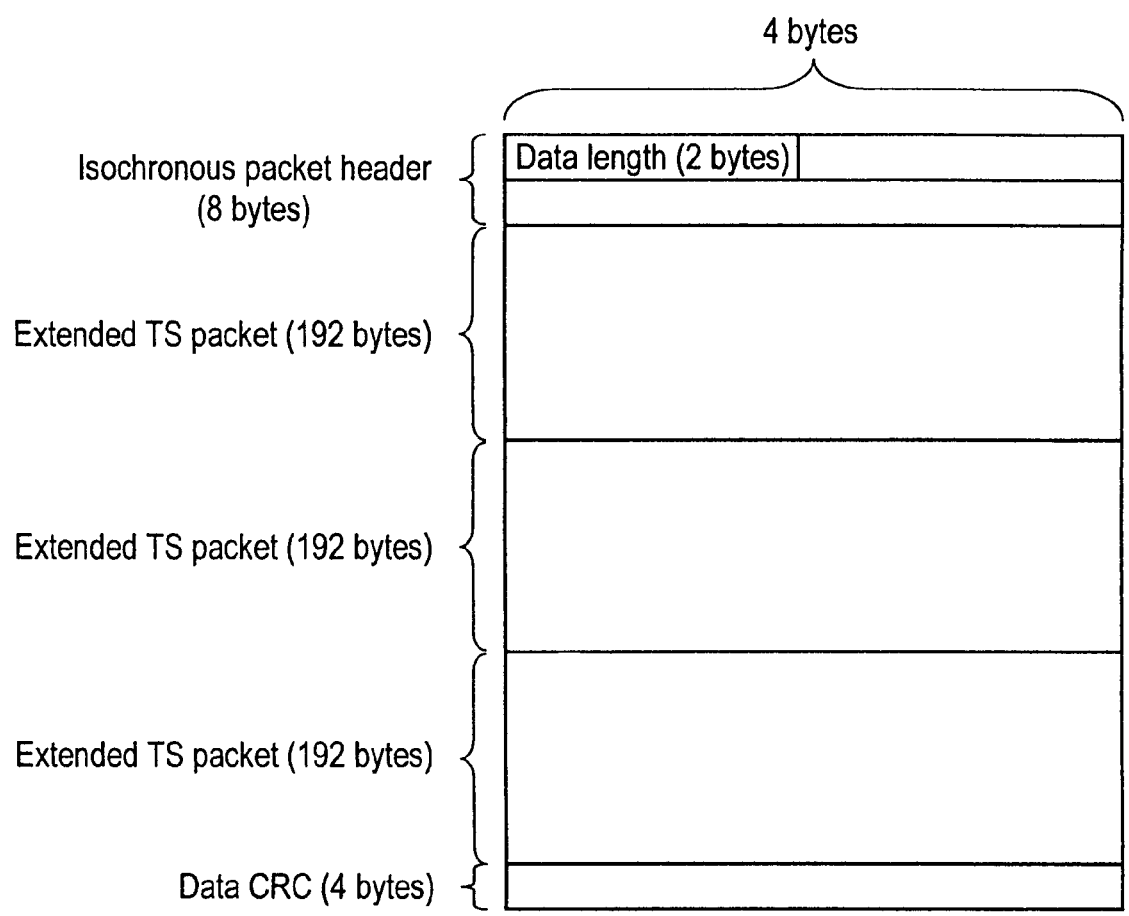
FIG. 15 illustrates a first IEEE1394 packet structure in accordance with the second exemplary embodiment of the present invention.
Figure 16:
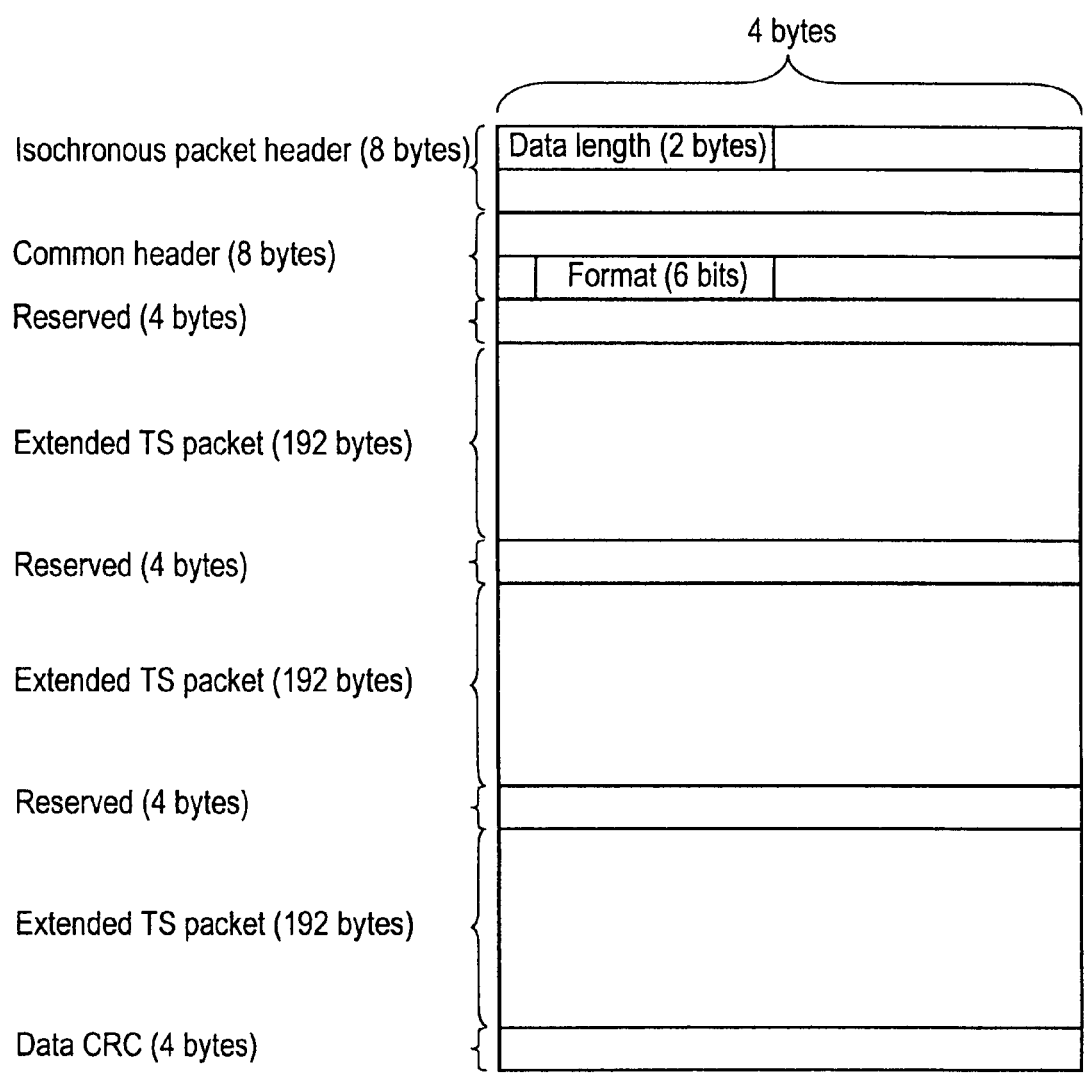
FIG. 16 illustrates a second IEEE1394 packet structure in accordance with the second exemplary embodiment of the present invention.

FIG. 12 shows the configuration of a content transmitter in a second exemplary embodiment of the present invention. FIG. 13 shows a configuration of an IEEE1394 interface in the second exemplary embodiment. FIG. 14 shows a transition of a packet structure in the content receiver in the second exemplary embodiment. FIGS. 15 and 16 show the structure of a packet transmitted by the IEEE1394 interface.

In FIG. 12, configuration and operation until storing the packet received from the Internet network to storage device 32 are the same as those in the first exemplary embodiment, and thus their description is omitted here. Read-out controller 36 reads out the extended TS packet stored in storage device 32 synchronizing with a predetermined frequency clock generated by extended TS packet read-out clock generator 37 according to a command from microcomputer 29. In this case, a predetermined time interval is inserted between extended TS packets, as shown by S10 in FIG. 14, before output (S10 in FIG. 14). This interval is set in response to the clock frequency of clock generator 37 in a way such that a bit rate of extended TS packets after inserting the time interval becomes greater than a bit rate for transmission of extended TS packets by the content transmitter.

IEEE1394 interface 38 conforms to the IEEE1394 standard, and outputs the extended TS packet input to IEEE1394 interface 38 in an isochronous transfer mode (S11 in FIG. 14). In S11, ISO is an header added in the IEEE1394 interface. A transmission signal between read-out controller 36 and IEEE1394 interface 38 is composed in the same way as MPEG2-TS, i.e., data signal, clock signal, packet start signal, and data enable signal. At transmitting the extended TS packet, the microcomputer sets extended TS packet information to IEEE1394 interface 38. Details are described below.

FIG. 13 shows a configuration of the IEEE1394 interface. A stream of the extended TS packets is input to MPEG2 interface 41. DTCP encryption circuit 42 encrypts the extended TS packet output from MPEG2 interface 41 in accordance with the DTCP (Digital Transmission Content Protection) standard for protecting the copyright. Header adding circuit 43 adds the header to the DTCP-encrypted packet, and outputs this packet. This header is a header required for isochronous transfer.

Packet format information adding circuit 44 receives information for designating an extended TS packet format from the microcomputer via host interface 46. Packet format information adding circuit 44 then writes the data format of the packet to be ischronously transferred and information for identifying the extended TS packet at a predetermined position in the header.

The microcomputer inputs information designating the data size of the extended TS packet to packet data size information adding circuit 45 via host interface 46. Packet data size information adding circuit 45 then calculates and determines the data size of the isochronous packet based on this information. Or, the microcomputer inputs information on the size of the isochronous packet for storing the extended TS packet to packet data size information adding circuit 45 via host interface 46. Packet data size information adding circuit 45 then writes information on the data size of the packet to be isochronously transferred at a predetermined position in the header.

Now, the header added to the extended TS packet is described. FIGS. 15 and 16 show a format different from IEC61883-4 which specifies about the MPEG2 packet. FIG. 15 shows an example of adding only the isochronous header to the extended TS packet. In this case, only the packet data size is written in the data length region shown in FIG. 15. If the data size of the extended TS packet is 192 bytes, data of 588 bytes which is the sum of 576 bytes, three times of 192 bytes; and 12 bytes for the isochronous header and data CRC is written in the data length region in FIG. 15.

FIG. 16 shows an example that the extended TS packet has the isochronous header and common header. In this case, the packet data size is written in the data length region of the isochronous header in FIG. 16, and information for identifying the extended TS packet is written in the format region of the common header. If the data size of the extended TS packet is 192 bytes, 588 bytes, which is the sum of 4 bytes for reserved region and 192 multiplied by 3; 20 bytes for isochronous header, common header, and data CRC; and 4 bytes for the reserved region are added, and data of 612 bytes is written in the region shown in FIG. 16. The reserved region is a region secured for a future extension. Information for identifying the extended TS packet is data predetermined with the content transmitting party after excluding any data already in operation.

FIGS. 15 and 16 show an example of the isochronous packet storing three extended TS packets, but the number of packets is not limited to three. For example, the number of packets can be 4, 2, or 1. The data size of the extended TS packet is 192 bytes in the example, but this is not particularly limited. For example, the data size of the extended TS packet can be 196 bytes.

IEEE1394 isochronous packet transmitting circuit 47 shown in FIG. 13 is configured with a circuit realizing a protocol of a data link layer and physical layer in accordance with the IEEE1394 standard. IEEE1394 isochronous packet transmitting circuit 47 adds the header input to IEEE1394 isochronous packet transmitting circuit 47, and sends the packet to the 1394 bus.

As described above, the second exemplary embodiment can transmit the extended TS packet via the IEEE1394 interface. In addition, the contents receiver in the second exemplary embodiment can also realize the effect described in the first exemplary embodiment even with the configuration that the TS decoder (not illustrated) and AV decoder (not illustrated) are separately connected to the 1394 bus.

INDUSTRIAL APPLICABILITY

As described above, the content receiver of the present invention prevents decoding errors when a packet loss occurs on a communications network due to difficulty in compensating for the loss at the receiving party. Accordingly, the present invention is applicable to digital television broadcast receivers, personal computers, mobile phones, PDAs, and mobile phone adapters.

Furthermore, the content transmitter of the present invention allows storage of data efficiently in the storage device by ignoring the data arrival time at the receiving party. During reproduction, data can be reproduced at the level of accuracy required by the decoder using the time stamp indicating the time to output to the decoder. This prevents decoding errors that occur when the jitter compensation accuracy is insufficient to permit decoding. Accordingly, the present invention is effective for digital television broadcast receivers, personal computers, mobile phones, PDAs, and mobile phone adapters.

REFERENCE NUMERALS IN THE DRAWINGS

1 Video encoder
2 Audio encoder
3 Data encoder
4 System clock generator
5 Stream multiplexer
6 Scrambler
7 Time stamp adder
8 Super capsule generator
9 UDP/IP packetizer
10 Ethernet packetizer
11 Transmitter
12 Receiver
13 Re-send command detector
14 Microcomputer
15 Storage buffer
21 Receiver
22 Ethernet packet processor
23 UDP/IP packet processor
24 Capsule processor
25 Descrambler
26 Time stamp buffer
27 Extended TS reproducer
28 Storage controller
29 Microcomputer
31 Transmitter
32 Storage device
33 Reproduction controller
34 TS decoder
35 AV decoder
36 Read-out controller
37 Extended TS packet read-out clock generator
38 IEEE1394 interface
41 MPEG2 interface
42 DTCP encryption circuit
43 Header adding circuit
44 Packet format information adding circuit
45 Packet data size information adding circuit
46 Host interface
47 IEEE1394 packet transmitting circuit

The invention claimed is:

1. A content receiver for receiving and reproducing a content formed of a stream of super capsules, each super capsule including at least a capsule count and one or more extended transport packets sent from a transmitter, the content receiver comprising:
a capsule processor for detecting a discontinuity in the capsule count associated with the stream of super capsules and for determining a discontinuity direction of the capsule count such that the capsule processor outputs a changed stream of super capsules for storage in accordance with the determined discontinuity direction;
storage means for storing the content from the capsule processor;
system clock reproducing means for reproducing a system clock when encoding the transport packets;
a first counter for counting the system clock output from the system clock reproducing means; and
reproducing means for reproducing the content stored in the storage means,
wherein when each of the transport packets forming the content to be received is an extended transport packet to which reproduction time instructing information counting the system clock for encoding the transport packets is added, the reproducing means reproduces each of the extended transport packets stored at a timing that a count of the first counter and the reproduction time instructing information match after a predetermined offset.

2. A content transmitter for transmitting a content formed of a stream of super capsules, each super capsule including at least a capsule count and one or more transport packets, the content transmitter comprising:
transmission means for transmitting the content; and
a content transmitter counter for counting a system clock when encoding the transport packets;
wherein:
the transmission means transmits an extended transport packet which is made by adding a count output from the content transmitter counter as reproduction time instructing information for instructing time to reproduce from storage means of a receiving party to each of the transport packets to be transmitted,
the content transmitter further comprises a scrambler, wherein the reproduction time instructing information is added to the transport packets after scrambling,
the content transmitter counter is initialized at a time offset from the system clock, and
responsive to receiving a re-send command from a content receiver including a capsule count indicating a respective super capsule that is missing from a received stream and which has been replaced by the content receiver with a dummy super capsule in the received stream, the transmission means resends the respective super capsule corresponding to the capsule count.

3. The content receiver as defined in claim 1, wherein the content receiver receives the stream from the transmitter which is comprising:
transmission means for transmitting the content; and
a second counter for counting a system clock when encoding the transport packets;

wherein the transmission means transmits an extended transport packet which is made by adding a count output from the second counter as reproduction time instructing information for instructing time to reproduce from storage means of a receiving party to each of the transport packets to be transmitted.

4. The content receiver as defined in claim 1, wherein one or more extended transport packets are encapsulated, and the content receiver receives a super capsule in which capsule count information and capsule information indicating the content of the extended transport packet in the capsule are added to the capsule.

5. The content transmitter as defined in claim 2, wherein one and more extended transport packets are encapsulated, and the content transmitter transmits a super capsule in which capsule count information and capsule information indicating the content of the extended transport packet in the capsule are added to the capsule.

6. The content receiver as defined in claim 4, wherein the content receiver receives the stream from the content transmitter which comprises:
   transmission means for transmitting the content; and
   a second counter for counting the system clock when encoding the transport packets;
   wherein the transmission means transmits an extended transport packet which is made by adding a count output from the second counter as reproduction time instructing information for instructing time to reproduce from storage means of a receiving party to each of the transport packets to be transmitted.

7. The content receiver as defined in claim 4 further comprising storage control means for controlling an individual storage region based on the capsule information and the count information for storing the extended transport packet in the received super capsule to the storage means;
   wherein when discontinuity of the super capsule is recognized by confirming continuity of the count information, a re-send request command containing the count information is generated and transmitted to a transmitting party; and discontinuity is solved at reproduction by controlling in a way to store the extended transport packet in an applicable super capsule re-sent and received from the transmitting party in a region controlled by the storage control means based on the count information.

8. The content receiver as defined in claim 7, wherein when discontinuity in a direction same as the count is detected on confirming the continuity of the count information, discontinuity of the super capsule is recognized.

9. A content receiver for receiving and reproducing a content formed of a stream of transport packets sent from a transmitter, the content receiver comprising:
   storage means for storing the content received;
   system clock reproducing means for reproducing a system clock when encoding the transport packets;
   a first counter for counting the system clock output from the system clock reproducing means; and
   reproducing means for reproducing the content stored in the storage means,
   wherein:
   when each of the transport packets forming the content to be received is an extended transport packet to which reproduction time instructing information counting the system clock for encoding the transport packets is added, the reproducing means reproduces each of the extended transport packets stored at a timing that a count of the first counter and the reproduction time instructing information match after a predetermined offset,
   one or more extended transport packets are encapsulated, as a super capsule, and the content receiver receives the super capsule in which capsule count information and capsule information indicating the content of the extended transport packet in the capsule are added to the capsule, and
   when discontinuity of the super capsule is recognized by confirming continuity of the count information, a re-send request command containing the count information is generated and transmitted to a transmitting party, a dummy super capsule is generated and stored in the storage means instead of a missing super capsule and an applicable re-sent super capsule is controlled to overwrite the dummy super capsule and stored.

10. The content transmitter as defined in claim 5 further comprising a buffer for storing a predetermined number of super capsules to be transmitted, wherein when the content transmitter receives a re-sent request command generated using the count information from the receiving party, an applicable super capsule having the count information is detected and re-sent to the receiving party.

11. The content receiver as defined in claim 7, wherein the content receiver receives the stream from the transmitter which comprises:
   transmission means for transmitting the content; and
   a second counter for counting the system clock when encoding the transport packets;
   wherein the transmission means transmits an extended transport packet which is made by adding a count output from the second counter as reproduction time instructing information for instructing time to reproduce from storage means of a receiving party to each of the transport packets to be transmitted,
   wherein one or more extended transport packets are encapsulated, and the transmitter transmits a super capsule in which capsule count information and capsule information indicating the content of the extended transport packet in the capsule are added to the capsule,
   further comprising a buffer for storing a predetermined number of super capsules to be transmitted, wherein when the transmitter receives a re-sent request command generated using the count information from the receiving party, an applicable super capsule having the count information is detected and re-sent to the receiving party.

12. The content receiver as defined in claim 4, wherein a number of the extended transport packets stored in the super capsule is set in a way such that data size of a data region in the packets at transmission is within a MTU (Maximum Transmission Unit) of a communications network.

13. The content transmitter as defined in claim 5, wherein a number of the extended transport packets stored in the super capsule is set in a way such that data size of a data region in the packets at transmission is within a MTU (Maximum Transmission Unit) of a communications network.

14. The content receiver as defined in claim 1 further comprising a descrambler, wherein the descrambler descrambles the transport packets after removing the reproduction time instructing information, the reproduction time instructing information is re-added to reproduce the extended transport packets, and the extended transport packets are stored in the storage means.

15. A content receiver for receiving and reproducing a content formed of a stream of super capsules, each super capsule including at least a capsule count and one or more extended transport packets sent from a transmitter, the content receiver comprising:

a capsule processor for detecting a discontinuity in the capsule count associated with the stream of super capsules and for determining a discontinuity direction of the capsule count such that the capsule processor outputs a changed stream of super capsules for storage in accordance with the determined discontinuity direction;

storage means for storing the content from the capsule processor;

system clock reproducing means for reproducing a system clock when encoding the extended transport packets;

a first counter for counting the system clock output from the system clock reproducing means; and reproducing means for reproducing the content stored in the storage means, wherein when each of the transport packets forming the content to be received is an extended transport packet to which reproduction time instructing information counting the system clock for encoding the transport packets is added, the reproducing means reproduces each of the extended transport packets stored at a timing that a count of the first counter and the reproduction time instructing information match after a predetermined offset, and wherein said content receiver further comprises a descrambler, wherein the descrambler descrambles the transport packets after removing the reproduction time instructing information, the reproduction time instructing information is re-added to reproduce the extended transport packets, and the extended transport packets are stored in the storage means, and wherein the content receiver receives the stream from the transmitter which comprises:

transmission means for transmitting the content; and a second counter for counting a system clock when encoding the transport packets;

wherein the transmission means transmits an extended transport packet which is made by adding a count output from the second counter as reproduction time instructing information for instructing time to reproduce from storage means of a receiving party to each of the transport packets to be transmitted, further comprising a scrambler, wherein the reproduction time instructing information is added to the transport packets after scrambling.

16. The content receiver as defined in claim 1, wherein the extended transport packet stored in a data region of IP datagram in an IP protocol is extracted for storing the stream in an IP packet received from the transmitting party via an IP protocol network to the storage means.

17. The content transmitter as defined in claim 2, wherein the extended transport packet is stored in a data region of an IP datagram in an IP protocol, and then an IP packet is transmitted to the receiving party via an IP protocol network.

18. The content receiver as defined in claim 16, wherein the content receiver receives the stream from a content transmitter for transmitting a content formed of a stream of encoded transport packets, the content transmitter comprising:

transmission means for transmitting the content; and a second counter for counting a system clock when encoding the transport packets;

wherein the transmission means transmits an extended transport packet which is made by adding a count output from the second counter as reproduction time instructing information for instructing time to reproduce from storage means of a receiving party to each of the transport packets to be transmitted.

19. The content receiver as defined in claim 1 further comprising an IEEE1394 interface, wherein the IEEE1394 interface receives the extended transport packet reproduced, adds information for identifying the extended transport packet to the packet, and transmits the packet to an IEEE 1394 bus.

20. The content receiver as defined in claim 1, wherein the storage means consecutively stores the extended transport packets in a storage region without adding time information.

21. A content receiver for receiving and reproducing a content formed of a stream of transport packets sent from a transmitter, the content receiver comprising:

storage means for storing the content received;

system clock reproducing means for reproducing a system clock when encoding the transport packets;

a first counter for counting the system clock output from the system clock reproducing means; and reproducing means for reproducing the content stored in the storage means, wherein:

when each of the transport packets forming the content to be received is an extended transport packet to which reproduction time instructing information counting the system clock for encoding the transport packets is added, the reproducing means reproduces each of the extended transport packets stored at a timing that a count of the first counter and the reproduction time instructing information match after a predetermined offset, one or more extended transport packets are encapsulated, as a super capsule, and the content receiver receives the super capsule in which capsule count information and capsule information indicating the content of the extended transport packet in the capsule are added to the capsule, when discontinuity in a direction same as the count is detected on confirming continuity of the count information, discontinuity of the super capsule is recognized, and when discontinuity of the super capsule is recognized by confirming the continuity of the count information, a re-send request command containing the count information is generated and transmitted to a transmitting party, a dummy super capsule is generated and stored in the storage means instead of a missing super capsule and an applicable re-sent super capsule is controlled to overwrite the dummy super capsule and stored.

22. A content receiver for receiving and reproducing a content formed of a stream of transport packets sent from a transmitter, the content receiver comprising:

storage means for storing the content received;

system clock reproducing means for reproducing a system clock when encoding the transport packets;

a first counter for counting the system clock output from the system clock reproducing means; and reproducing means for reproducing the content stored in the storage means, wherein:

when each of the transport packets forming the content to be received is an extended transport packet to which reproduction time instructing information counting the system clock for encoding the transport packets is added, the reproducing means reproduces each of the extended transport packets stored at a timing that a count of the first counter and the reproduction time instructing information match after a predetermined offset, one or more extended transport packets are encapsulated, as a super capsule, and the content receiver receives the super capsule in which capsule count information and capsule information indicating the content of the extended transport packet in the capsule are added to the capsule, and when discontinuity of the super capsule is recognized by confirming continuity of the count information and when the recognized discontinuity in a direction same as the count is detected on confirming the continuity of the count information, a super capsule is recognized as missing.

23. A content receiver for receiving and reproducing a content formed of a stream of transport packets sent from a transmitter, the content receiver comprising:

storage means for storing the content received;
system clock reproducing means for reproducing a system clock when encoding the transport packets;
a first counter for counting the system clock output from the system clock reproducing means; and
reproducing means for reproducing the content stored in the storage means,
wherein:
when each of the transport packets forming the content to be received is an extended transport packet to which reproduction time instructing information counting the system clock for encoding the transport packets is added, the reproducing means reproduces each of the extended transport packets stored at a timing that a count of the first counter and the reproduction time instructing information match after a predetermined offset,
one or more extended transport packets are encapsulated, as a super capsule, and the content receiver receives the super capsule in which capsule count information and capsule information indicating the content of the extended transport packet in the capsule are added to the capsule, and
when a missing super capsule is detected, a dummy super capsule is generated and stored in the storage means instead of the missing super capsule and an applicable re-sent super capsule is controlled to overwrite the dummy capsule and stored.

24. The content receiver as defined in claim 7, wherein a number of the extended transport packets stored in the super capsule is set in a way such that data size of a data region in the packets at transmission is within a MTU (Maximum Transmission Unit) of a communications network.

25. A content receiver for receiving and reproducing a content formed of a stream of super capsules, each super capsule including at least a capsule count and one or more encoded MPEG-2 transport packets sent from a transmitter, the content receiver comprising:

a capsule processor for detecting a discontinuity in the capsule count associated with the stream of super capsules and for determining a discontinuity direction of the capsule count such that the capsule processor outputs a changed stream of super capsules for storage in accordance with the determined discontinuity direction;
storage means for storing the content from the capsule processor;
system clock reproducing means for reproducing a MPEG system clock;
a first counter for counting the MPEG system clock output from the system clock reproducing means to calculate a count; and
a decoder for reproducing the content stored in the storage means;

wherein the system clock reproducing means reproduces the MPEG system clock so that a PCR signal output from the decoder and the count of the first counter are equal, and when each of the MPEG-2 transport packets forming the content to be received is an extended transport packet to which a count of the MPEG system clock when encoding the MPEG-2 transport packets is added as a time stamp, each of the extended transport packets stored in the storage means is output to the decoder at the time that the count of the first counter and the time stamp have a predetermined offset therebetween.

26. The content receiver as defined in claim 25, wherein at least one of the extended transport packet is encapsulated, and the content receiver receives the super capsule in which capsule count information and capsule information indicating a content of the extended transport packet in the capsule are added to the capsule.

27. The content receiver as defined in claim 26 further comprising storage control means for controlling an individual storage region based on the capsule information and the count information when storing the extended transport packet in the received super capsule to the storage means;
wherein when the discontinuity of the super capsule is recognized by confirming continuity of the count information, a re-send request command containing the count information is generated and transmitted to a transmitting party; and the discontinuity is solved at reproduction by controlling so as to store the extended transport packet in an applicable super capsule re-sent and received from the transmitting party in a region controlled by the storage control means based on the count information.

28. The content receiver as defined in claim 27, wherein when the discontinuity in a direction of increase of the count information is detected on confirming the continuity of the count information, the discontinuity of the super capsule is recognized.

29. A content receiver for receiving and reproducing a content formed of a stream of encoded MPEG-2 transport packets sent from a transmitter, the content receiver comprising:

storage means for storing the content received;
system clock reproducing means for reproducing a MPEG system clock;
a first counter for counting the MPEG system clock output from the system clock reproducing means to calculate a count; and
a decoder for reproducing the content stored in the storage means;
wherein:
the system clock reproducing means reproduces the MPEG system clock so that a PCR signal output from the decoder and the count of the first counter are equal,
when each of the MPEG-2 transport packets forming the content to be received is an extended transport packet to which a count of the MPEG system clock when encoding the MPEG-2 transport packets is added as a time stamp, each of the extended transport packets stored in the storage means is output to the decoder at the time that the count of the first counter and the time stamp have a predetermined offset therebetween, and
at least one of the extended transport packet is encapsulated, as a super capsule, and the content receiver receives the super capsule in which capsule count information and capsule information indicating a content of the extended transport packet in the capsule are added;

the content receiver further comprising storage control means for controlling an individual storage region based on the capsule information and the count information when storing the extended transport packet in the received super capsule to the storage means, wherein:

when discontinuity of the super capsule is recognized by confirming continuity of the count information, a re-send request command containing the count information is generated and transmitted to a transmitting party, the discontinuity is solved at reproduction by controlling so as to store the extended transport packet in an applicable super capsule re-sent and received from the transmitting party in a region controlled by the storage control means based on the count information, and a dummy super capsule is generated and stored in the storage means instead of a missing super capsule and an applicable re-sent super capsule is controlled to be stored by overwriting the dummy capsule and stored.

30. The content receiver as defined in claim 26, wherein a number of the extended transport packets stored in the super capsule is set such that data size of a data region in the packets at transmission is within a MTU (Maximum Transmission Unit) of a communications network.

31. The content receiver as defined claim 25, further comprising a descrambler, wherein when the extended transport packet is store in the storage means, after a descrambler descrambles the MPEG-2 transport packets in which the time stamp is removed, the time stamp is re-added to reproduce the extended transport packets, and the extended transport packets are stored in the storage means.

32. The content receiver as defined in claim 25, wherein the extended transport packet stored in a data region of IP datagram in an IP protocol is extracted when storing the stream in an IP packet received from the transmitting party via an IP protocol network to the storage means.

33. A content receiver for receiving and reproducing a content formed of a stream of super capsules, each super capsule including at least a capsule count and one or more encoded MPEG-2 transport packets sent from a transmitter, the content receiver comprising:

a capsule processor for detecting a discontinuity in the capsule count associated with the stream of super capsules and for determining a discontinuity direction of the capsule count such that the capsule processor outputs a changed stream of super capsules for storage in accordance with the determined discontinuity direction;

storage means for storing the content from the capsule processor;

system clock reproducing means for reproducing a MPEG system clock;

a first counter for counting the system clock output from the system clock reproducing means to calculate a count; and a decoder for reproducing the content stored in the storage means;

wherein:

the system clock reproducing means reproduces the MPEG system clock so that a PCR signal output from the decoder and the count of the first counter are equal, and when each of the MPEG-2 transport packets forming the content to be received is an extended transport packet to which a count of the MPEG system clock when encoding the MPEG-2 transport packets is added as a 4-byte time stamp, each of the extended transport packets stored in the storage means is output to the decoder at a timing that the count of the first counter and the time stamp have a predetermined offset therebetween.

34. A content receiver for receiving and reproducing a content formed of a stream of encoded MPEG-2 transport packets sent from a transmitter, the content receiver comprising:

storage means for storing the content received;

system clock reproducing means for reproducing a MPEG system clock;

a first counter for counting the MPEG system clock output from the system clock reproducing means to calculate a count; and a decoder for reproducing the content stored in the storage means;

wherein:

the system clock reproducing means reproduces the MPEG system clock so that a PCR signal output from the decoder and the count of the first counter are equal, and when each of the MPEG-2 transport packets forming the content to be received is an extended transport packet to which a count of the MPEG system clock when encoding the MPEG-2 transport packets is added as a time stamp, each of the extended transport packets stored in the storage means is output to the decoder at the time that the count of the first counter and the time stamp have a predetermined offset therebetween, and at least one of the extended transport packet is encapsulated, as a super capsule, and the content receiver receives the super capsule in which capsule count information and capsule information indicating a content of the extended transport packet in the capsule are added;

the content receiver further comprising storage control means for controlling an individual storage region based on the capsule information and the count information when storing the extended transport packet in the received super capsule to the storage means, wherein:

when discontinuity of the super capsule is recognized by confirming continuity of the count information, a re-send request command containing the count information is generated and transmitted to a transmitting party, when the discontinuity in a direction of increase of the count information is detected on confirming the continuity of the count information, the discontinuity of the super capsule is recognized, the discontinuity is solved at reproduction by controlling so as to store the extended transport packet in an applicable super capsule re-sent and received from the transmitting party in a region controlled by the storage control means based on the count information, and a dummy super capsule is generated and stored in the storage means instead of a missing super capsule and an applicable re-sent super capsule is controlled to be stored by overwriting the dummy capsule and stored.

35. The content receiver as defined in claim 28, wherein a number of the extended transport packets stored in the super capsule is set such that data size of a data region in the packets at transmission is within a MTU (Maximum Transmission Unit) of a communications network.

36. The content receiver as defined in claim 28, further comprising a descrambler, wherein when the extended transport packet is store in the storage means, after the descrambler descrambles the MPEG-2 transport packets in which the time stamp is removed, the time stamp is re-added to reproduce the extended transport packets, and the extended transport packets are stored in the storage means.

37. The content receiver as defined in claim 28, wherein the extended transport packet stored in a data region of IP datagram in an IP protocol is extracted when storing the stream in an IP packet received from the transmitting party via an IP protocol network to the storage means.

38. A content receiver for receiving and reproducing a content formed of a stream of super capsules, each super capsule including at least a capsule count and one or more extended transport packets sent from a transmitter, the content receiver comprising:
- a capsule processor for detecting a discontinuity in the capsule count associated with the stream of super capsules and for determining a discontinuity direction of the capsule count such that the capsule processor outputs a changed stream of super capsules for storage in accordance with the determined discontinuity direction;
- storage means for storing the content from the capsule processor;
- system clock reproducing means for reproducing a system clock when encoding the transport packets;
- a first counter for counting the system clock output from the system clock reproducing means; and
- reproducing means for reproducing the content stored in the storage means, wherein;
- when each of the transport packets forming the content to be received is an extended transport packet to which reproduction time instructing information counting the system clock for encoding the transport packets is added, the reproducing means reproduces each of the extended transport packets stored at a timing that a count of the first counter and the reproduction time instructing information match after a predetermined offset; and
- responsive to the determination of a first discontinuity direction, the capsule processor deletes at least one super capsule after the discontinuity and responsive to the determination of a second discontinuity direction, the capsule processor inserts at least one dummy super capsule after the discontinuity.

* * * * *